«12» United States Patent
Chok et al.

(10) Patent No.: US 9,581,015 B2
(45) Date of Patent: Feb. 28, 2017

(54) CLUSTERING PROCESS FOR ANALYZING PRESSURE GRADIENT DATA

(71) Applicant: Precision Energy Services, Inc., Fort Worth, TX (US)

(72) Inventors: Hamed Chok, Fort Worth, TX (US); Jeffery J. Hemsing, Humble, TX (US)

(73) Assignee: Precision Energy Services, Inc., Fort Worth, TX (US)

( * ) Notice: Subject to any disclaimer, the term of this patent is extended or adjusted under 35 U.S.C. 154(b) by 0 days.

(21) Appl. No.: 14/550,543

(22) Filed: Nov. 21, 2014

(65) Prior Publication Data
US 2015/0176393 A1 Jun. 25, 2015

Related U.S. Application Data

(63) Continuation of application No. 13/274,160, filed on Oct. 14, 2011, now Pat. No. 8,918,288.

(51) Int. Cl.
*E21B 47/12* (2012.01)
*E21B 47/06* (2012.01)
*G06K 9/62* (2006.01)
*E21B 49/10* (2006.01)
*E21B 49/00* (2006.01)
*G06N 5/04* (2006.01)

(52) U.S. Cl.
CPC .............. *E21B 47/06* (2013.01); *E21B 47/12* (2013.01); *E21B 49/003* (2013.01); *E21B 49/10* (2013.01); *G06K 9/6221* (2013.01); *G06K 9/6271* (2013.01); *G06N 5/04* (2013.01)

(58) Field of Classification Search
CPC ....................................................... E21B 47/12
USPC ............................................................ 702/11
See application file for complete search history.

(56) References Cited

U.S. PATENT DOCUMENTS 8,374,974 B2 * 2/2013 Chen .................... G06K 9/6298
706/8

* cited by examiner

Primary Examiner — Bryan Bui
(74) Attorney, Agent, or Firm — Blank Rome LLP

(57) ABSTRACT

Clustering analysis is used to partition data into similarity groups based on mathematical relationships between the measured variables. These relationships (or prototypes) are derived from the specific correlation required between the measured variables (data) and an environmental property of interest. The data points are partitioned into the prototype-driven groups (i.e., clusters) based on error minimization. Once the data is grouped, quantitative predictions and sensitivity analysis of the property of interest can be derived based on the computed prototypes. Additionally, the process inherently minimizes prediction errors due to the rigorous error minimization during data clustering while avoiding overfitting via algorithm parameterization. The application used to demonstrate the power of the method is pressure gradient analysis.

36 Claims, 24 Drawing Sheets

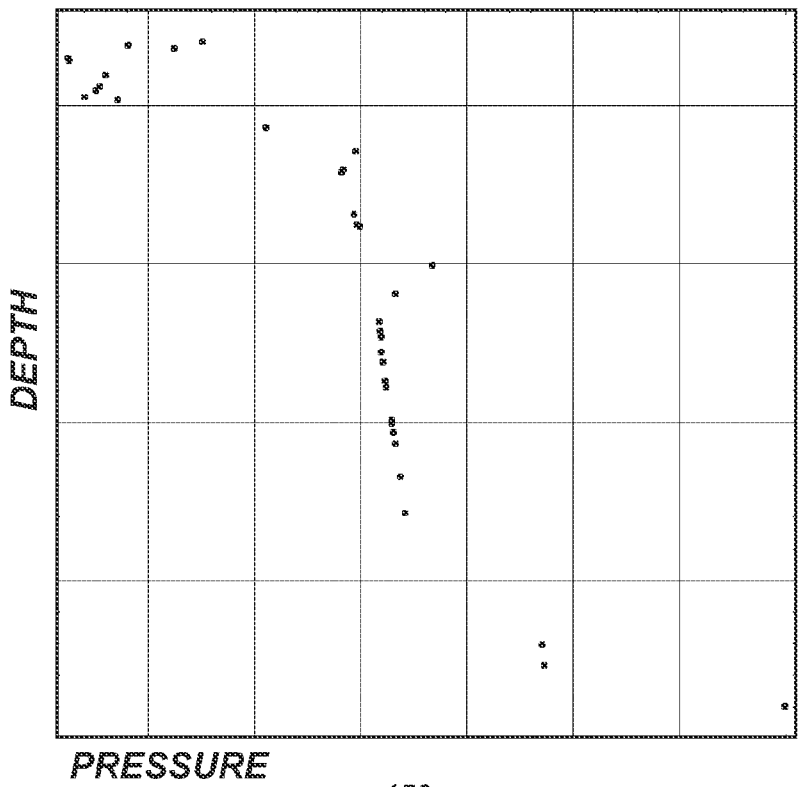
FIG. 8.1A
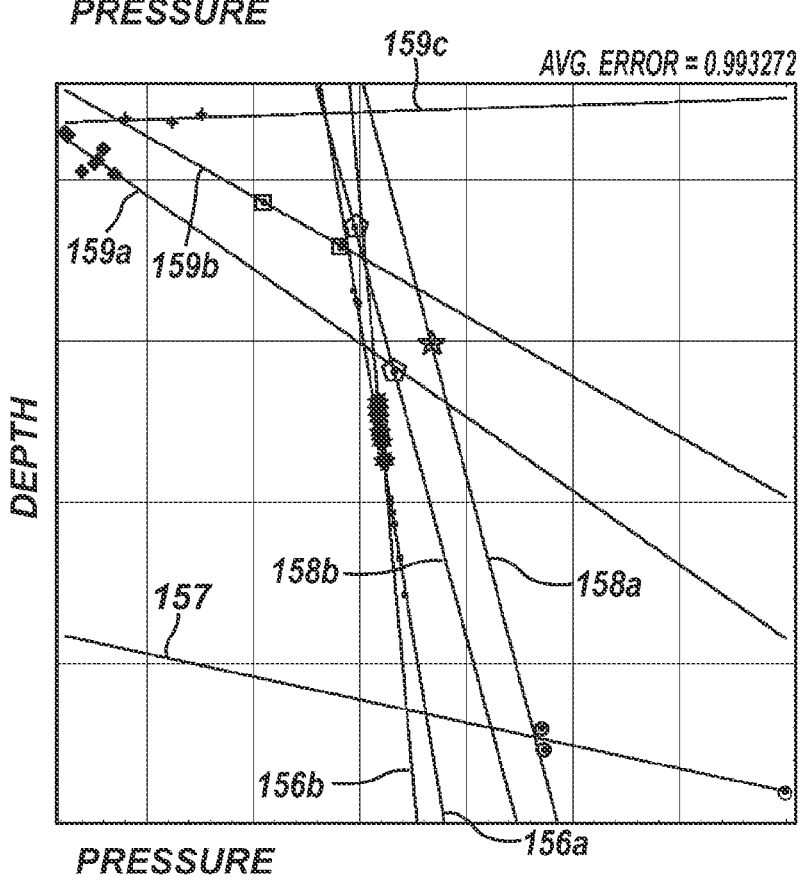
FIG. 8.1B

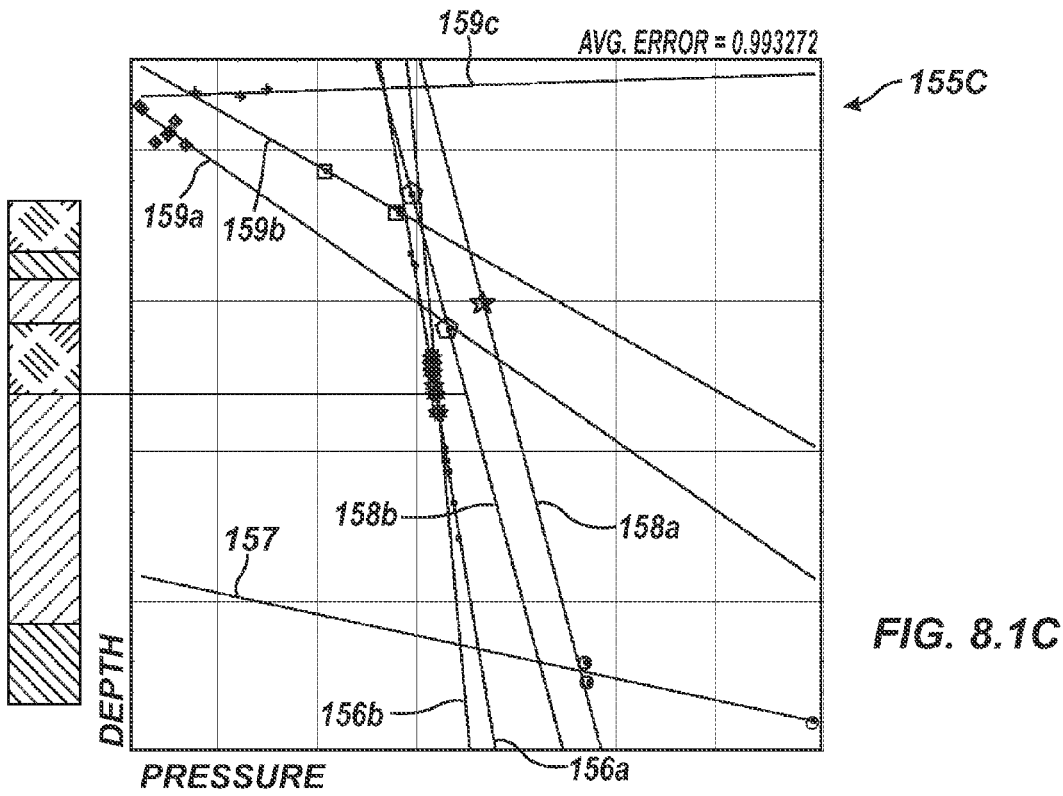
*FIG. 8.1C*
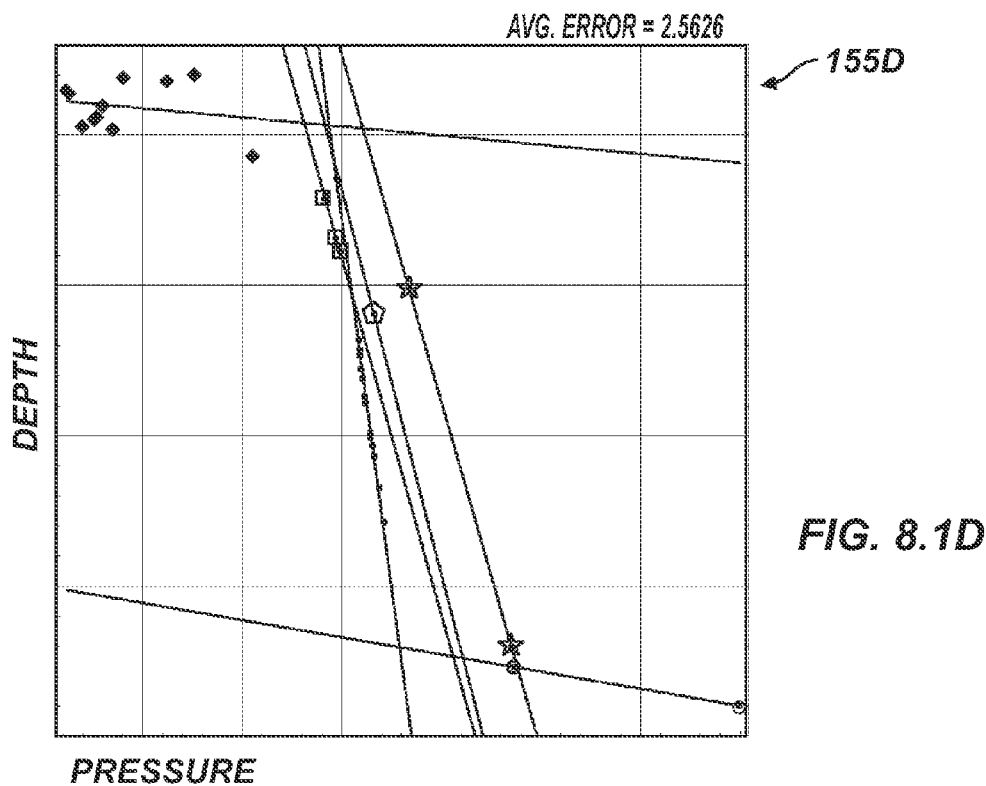
*FIG. 8.1D*

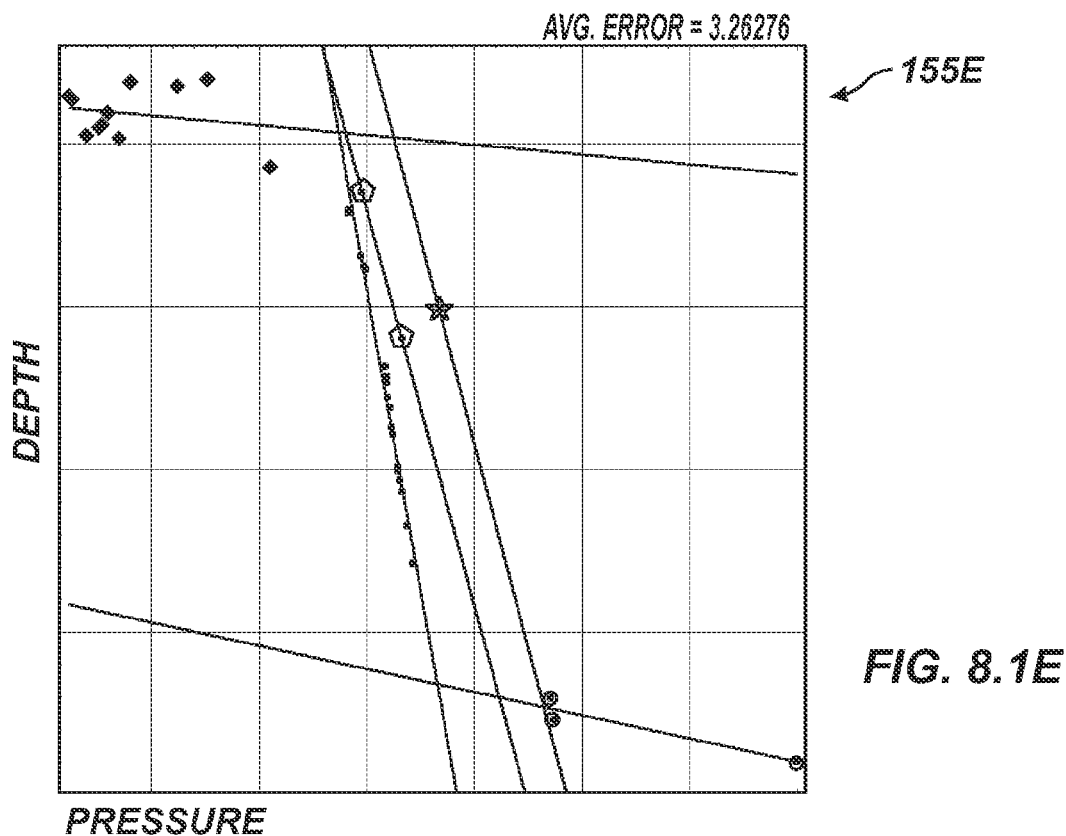
FIG. 8.1E
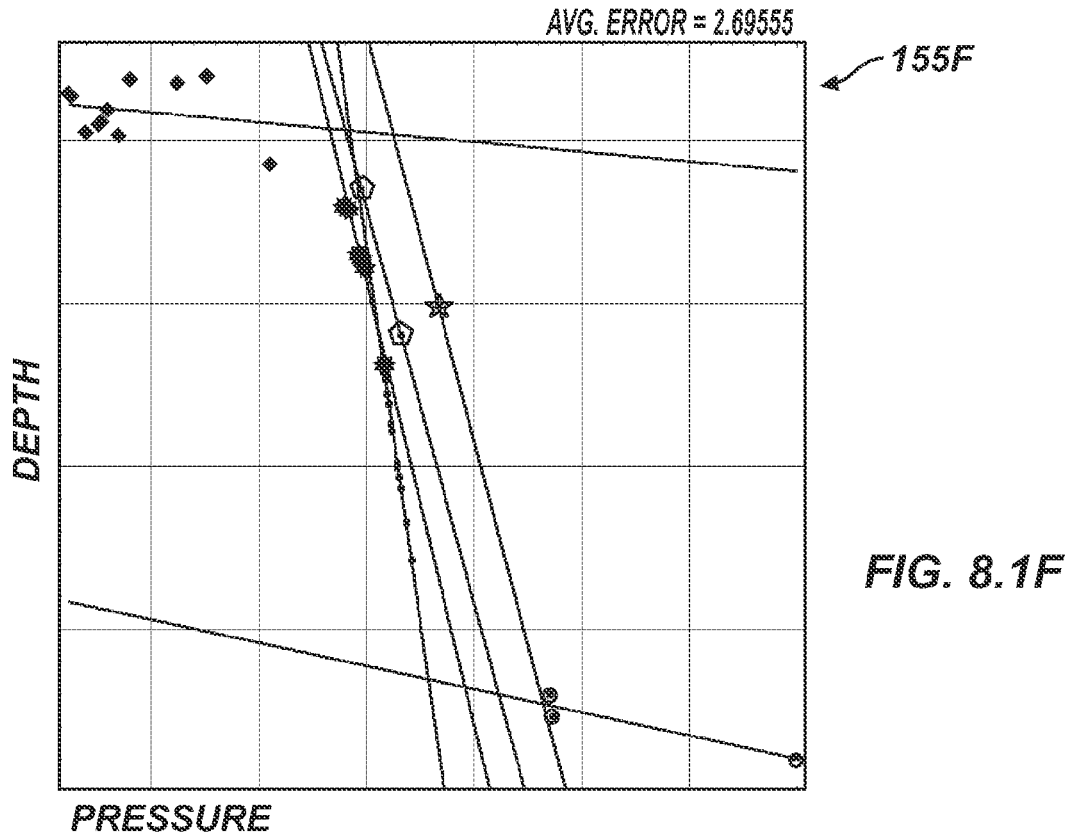
FIG. 8.1F

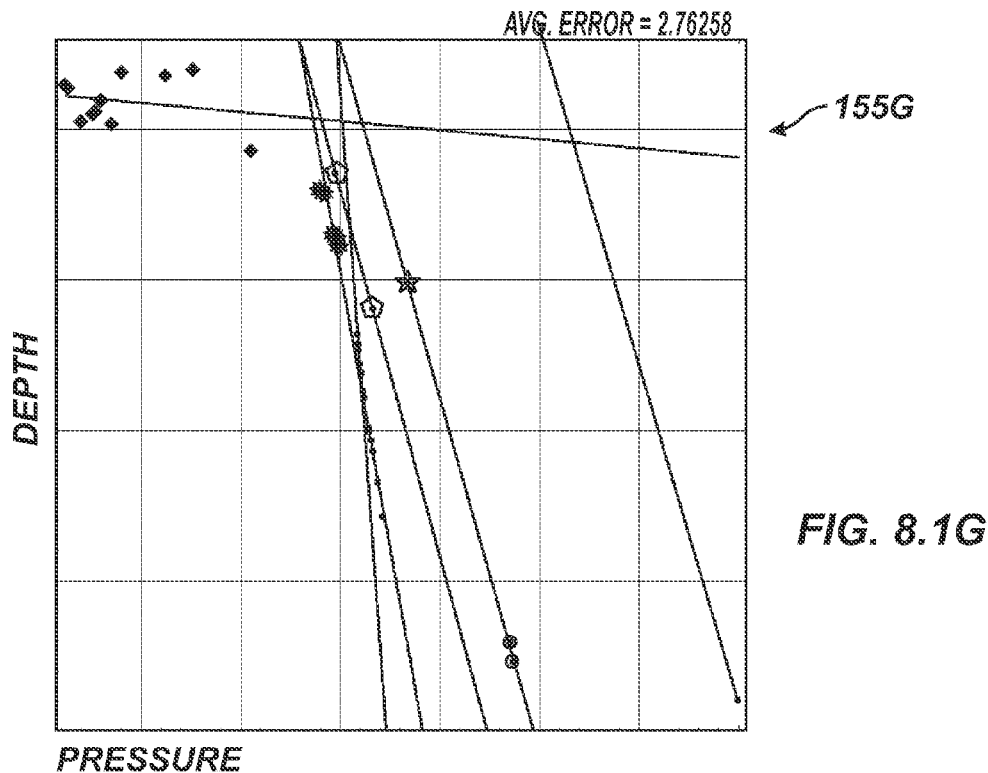
FIG. 8.1G
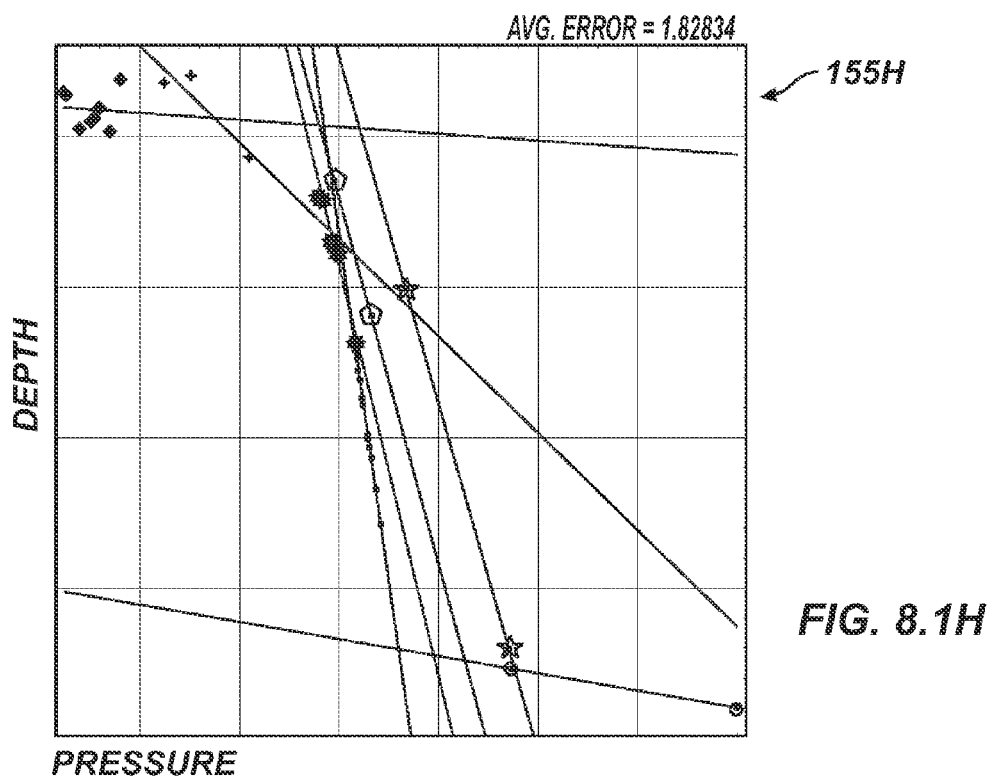
FIG. 8.1H

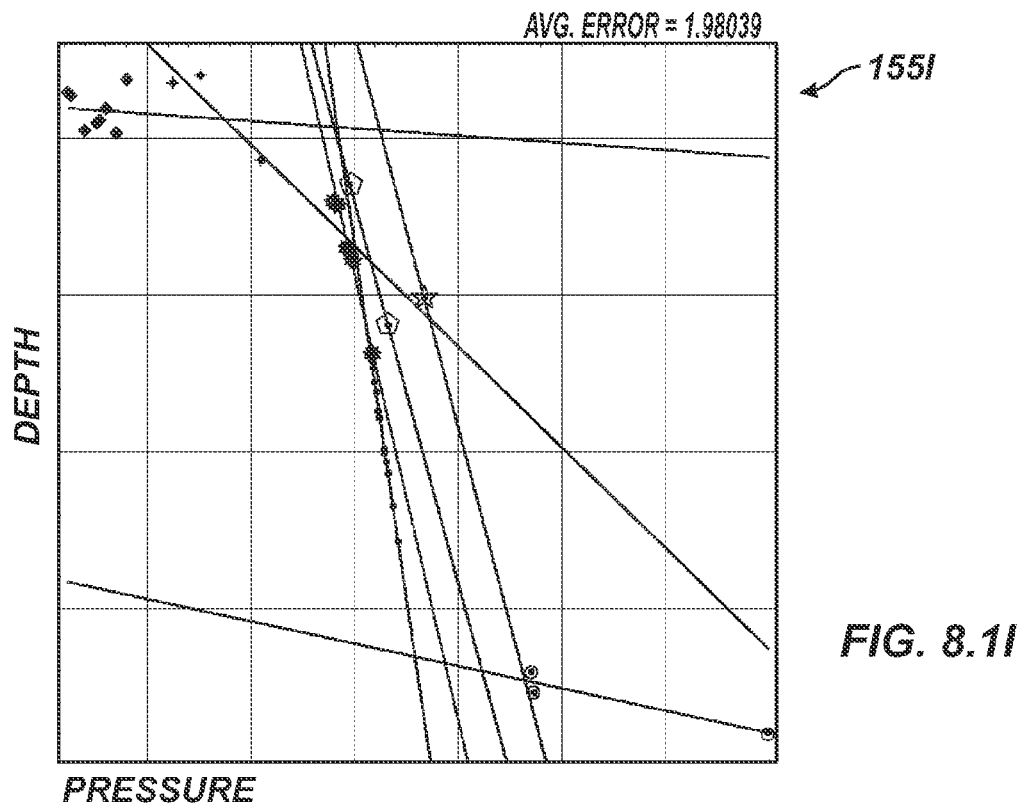
FIG. 8.1I
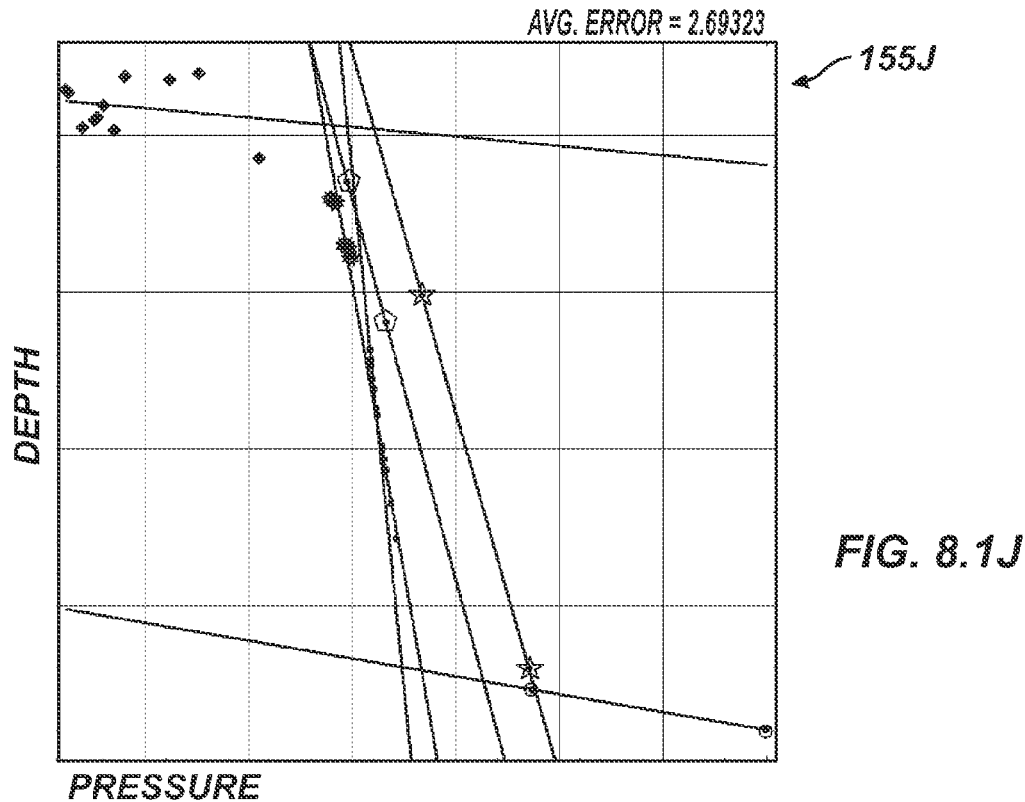
FIG. 8.1J

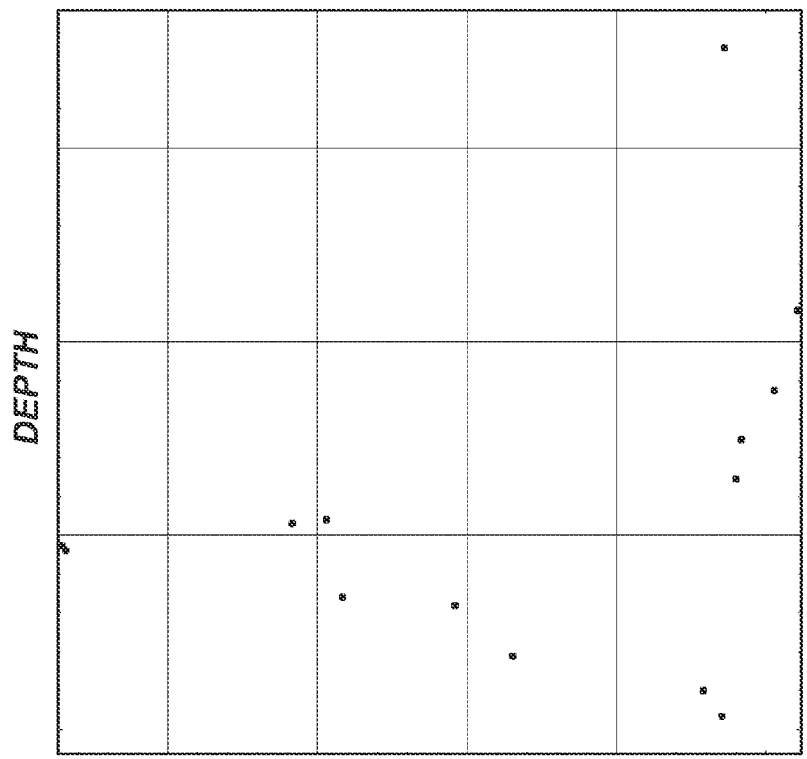
FIG. 8.2A
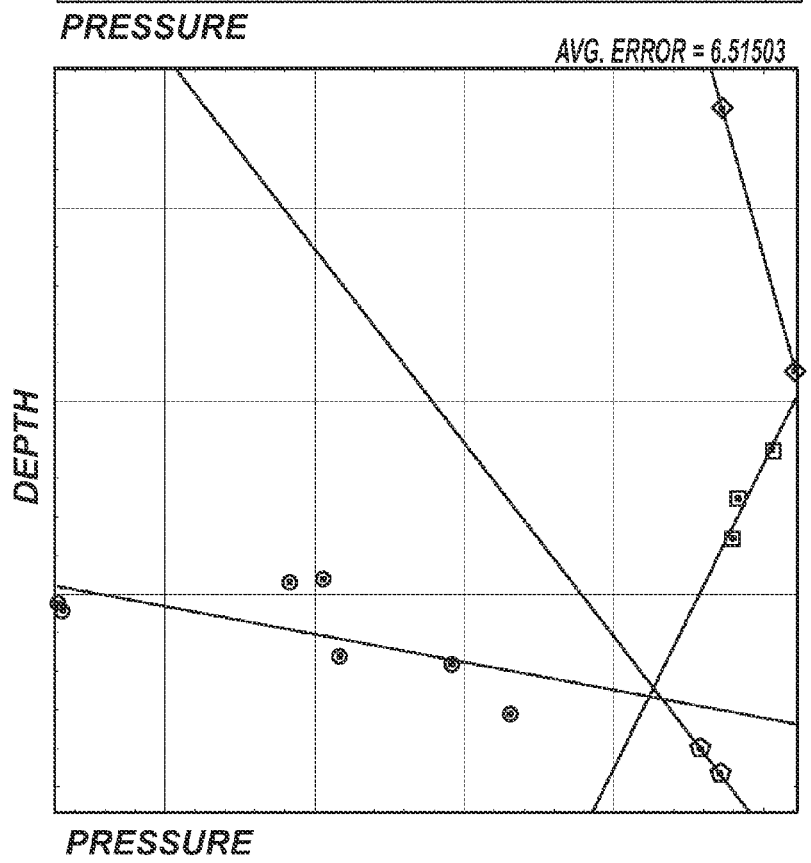
FIG. 8.2B

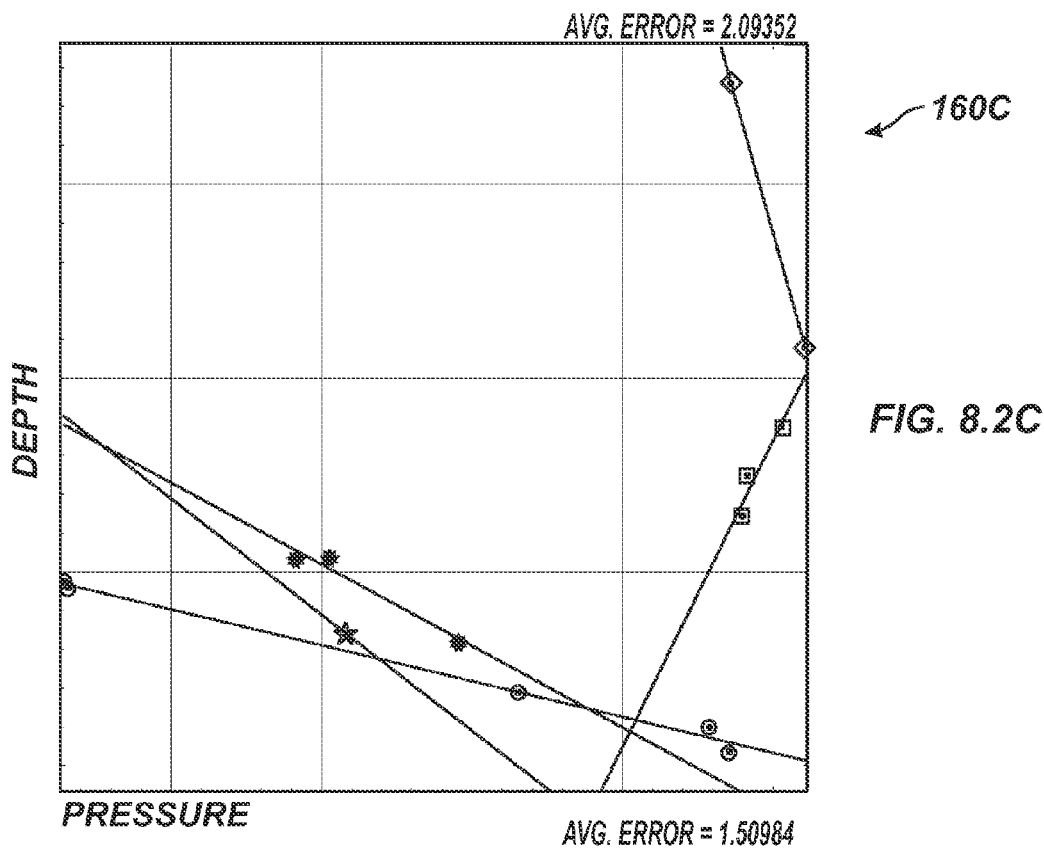
FIG. 8.2C
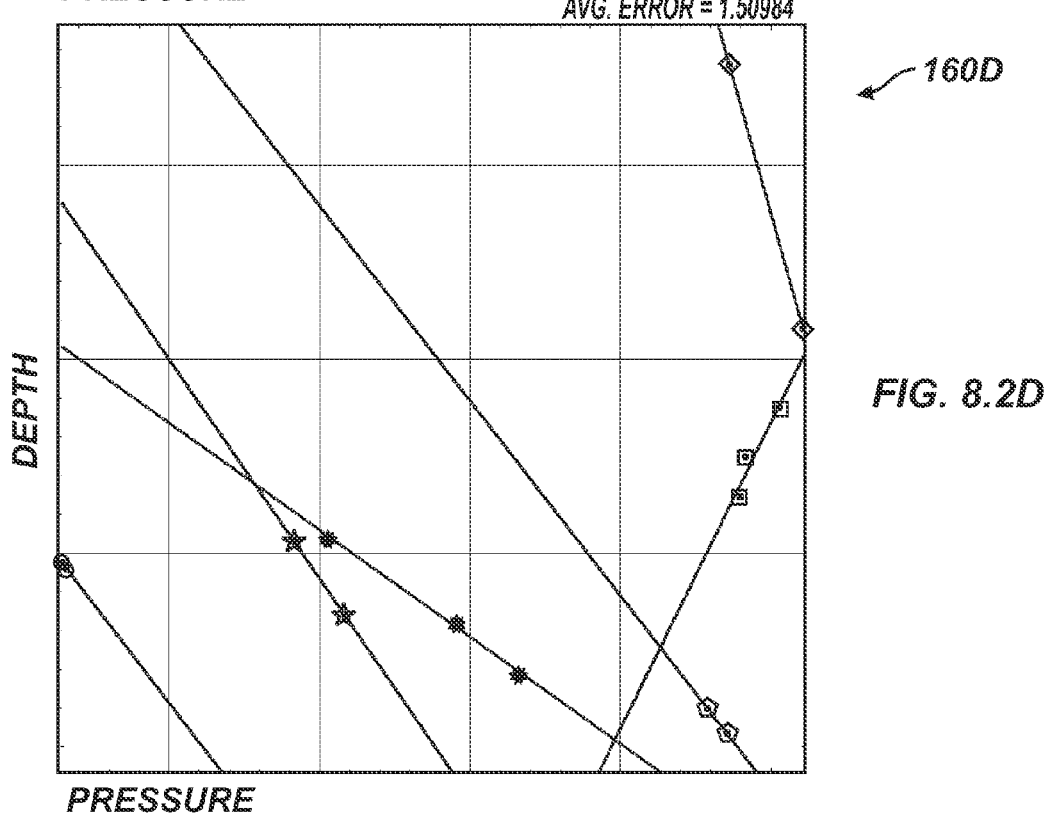
FIG. 8.2D

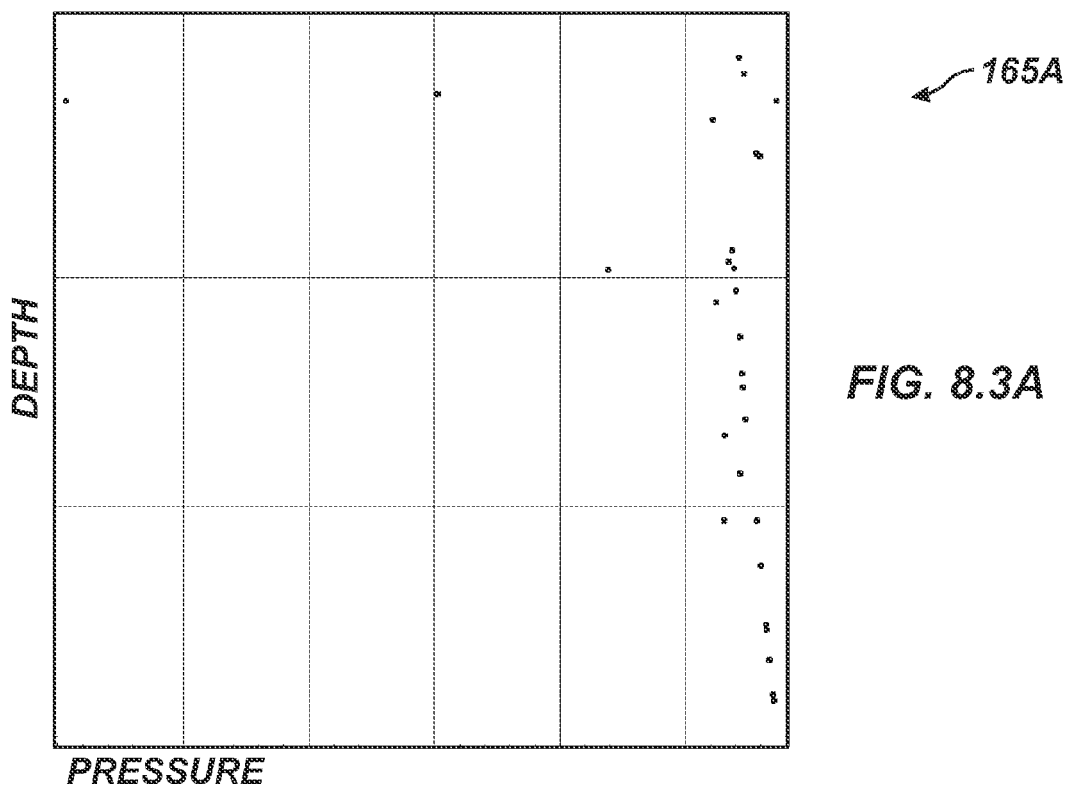
FIG. 8.3A

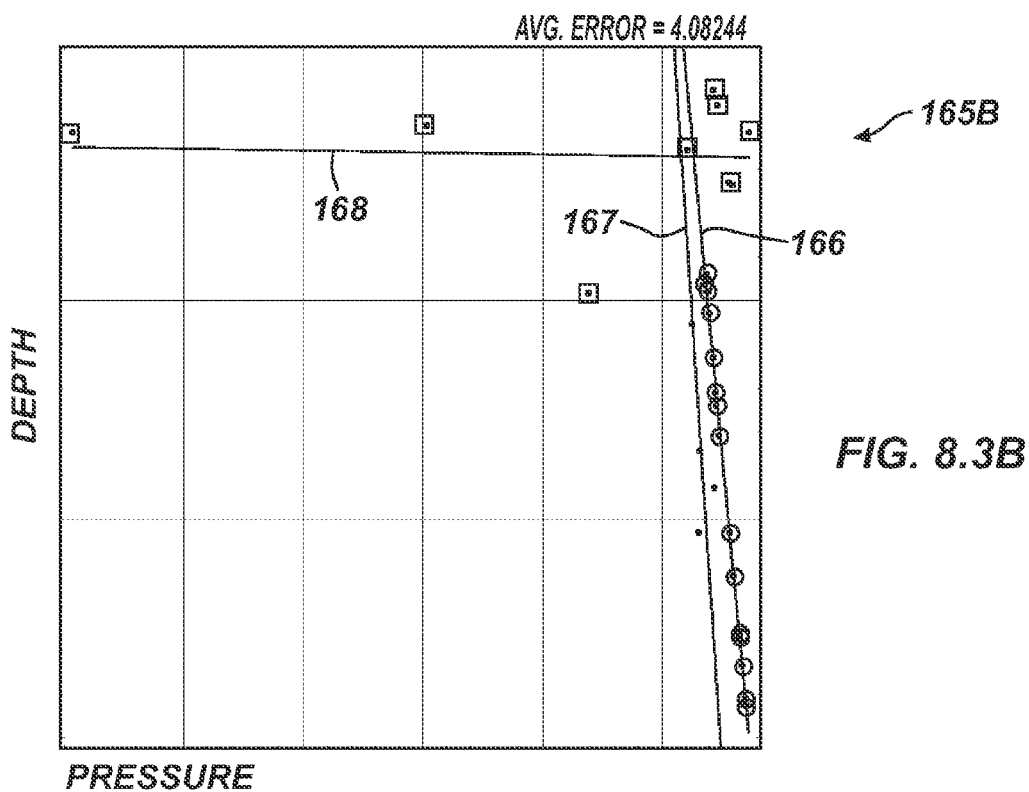
FIG. 8.3B
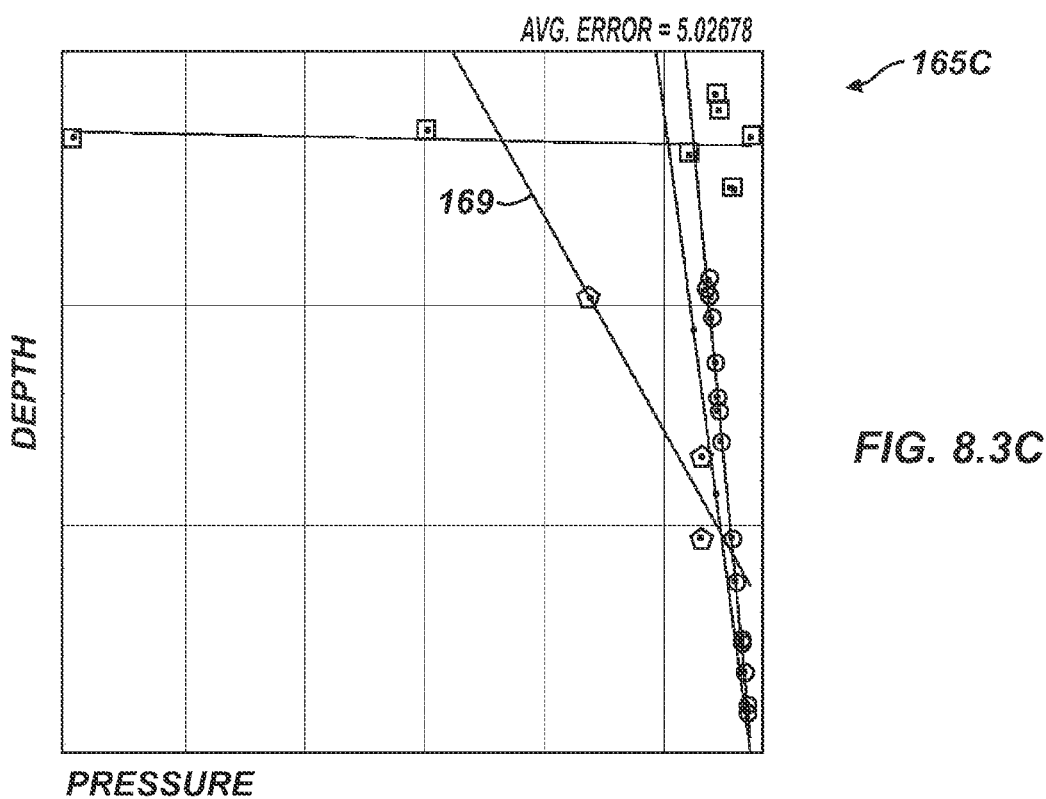
FIG. 8.3C

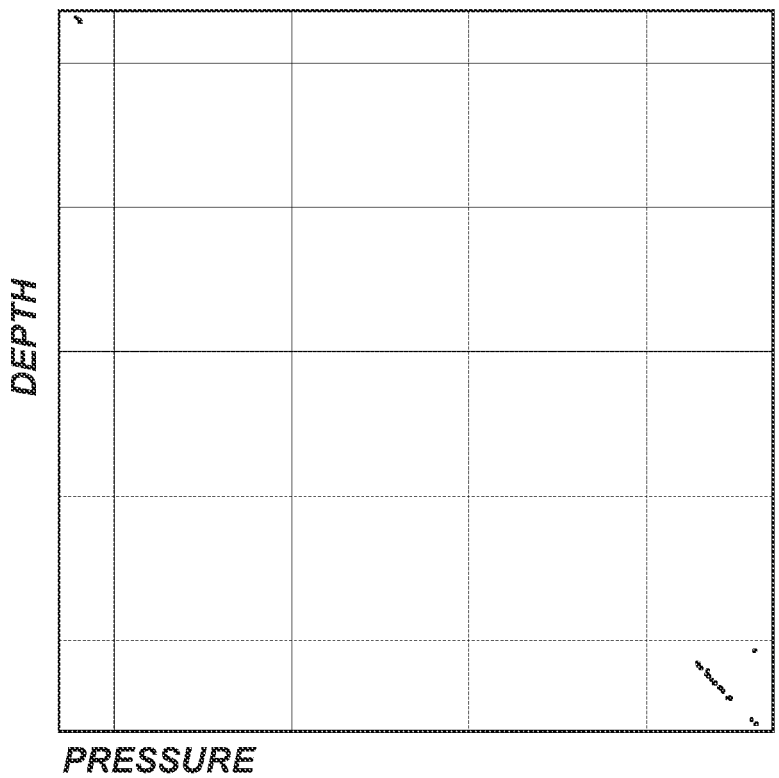
FIG. 8.4A
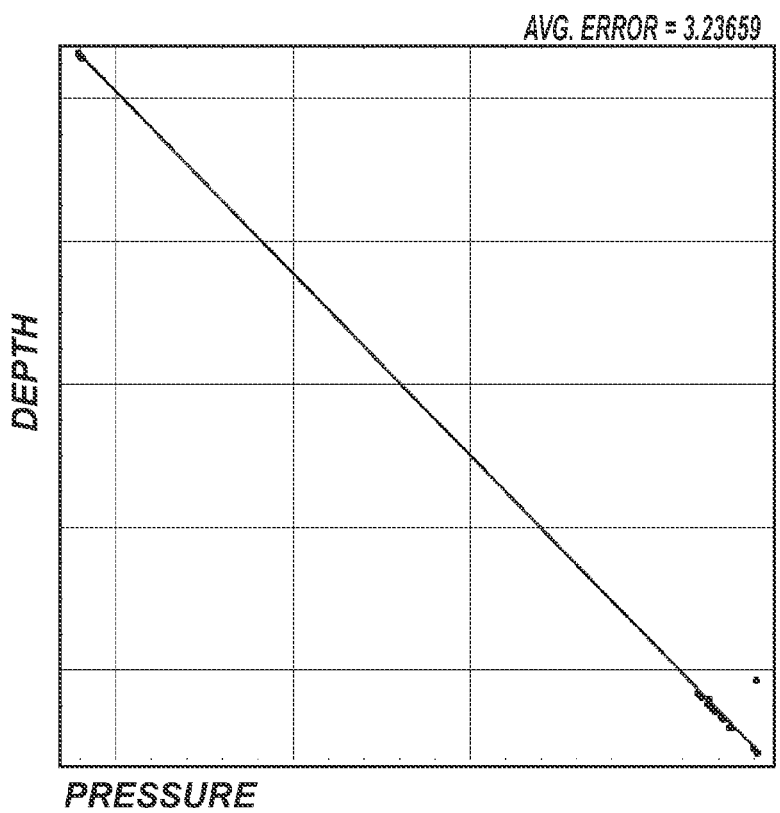
FIG. 8.4B

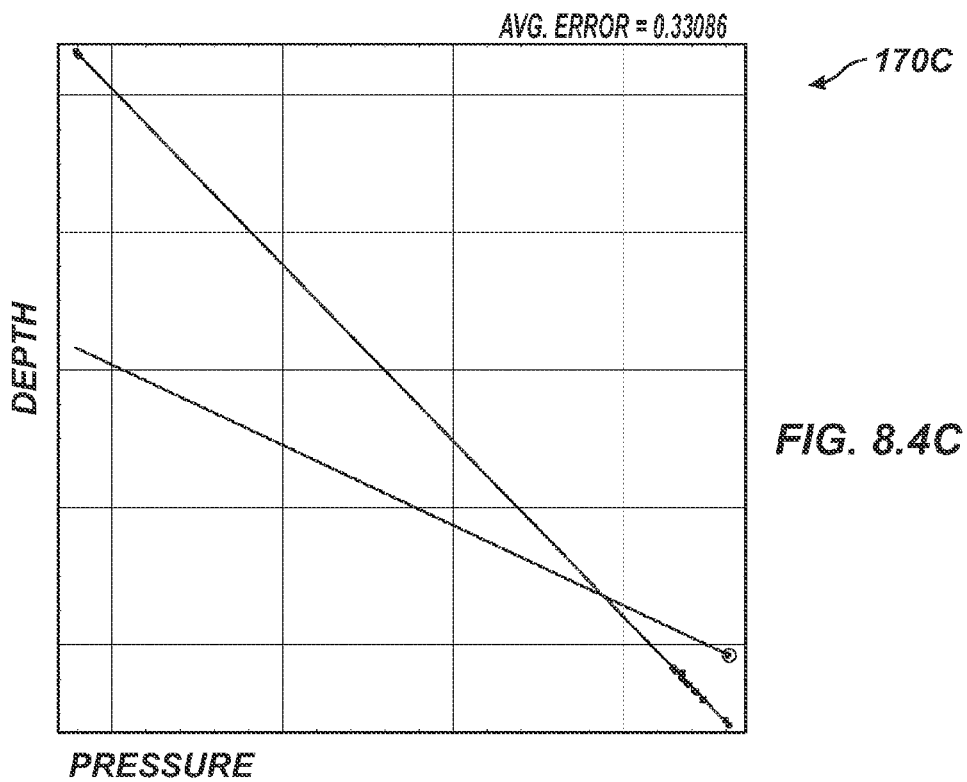
FIG. 8.4C
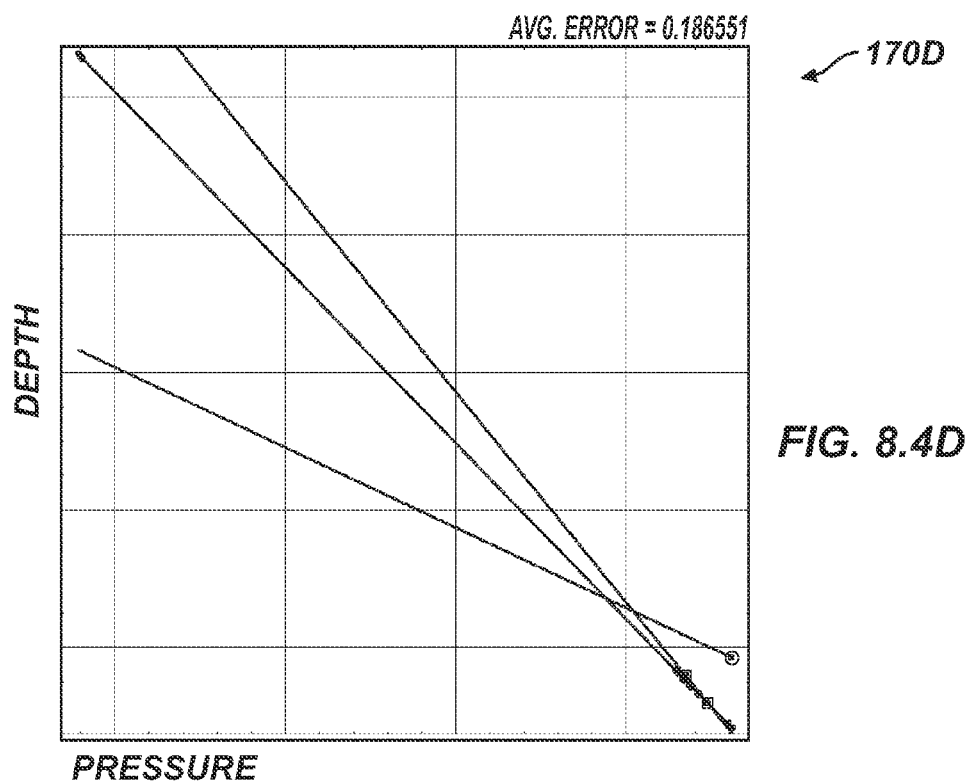
FIG. 8.4D

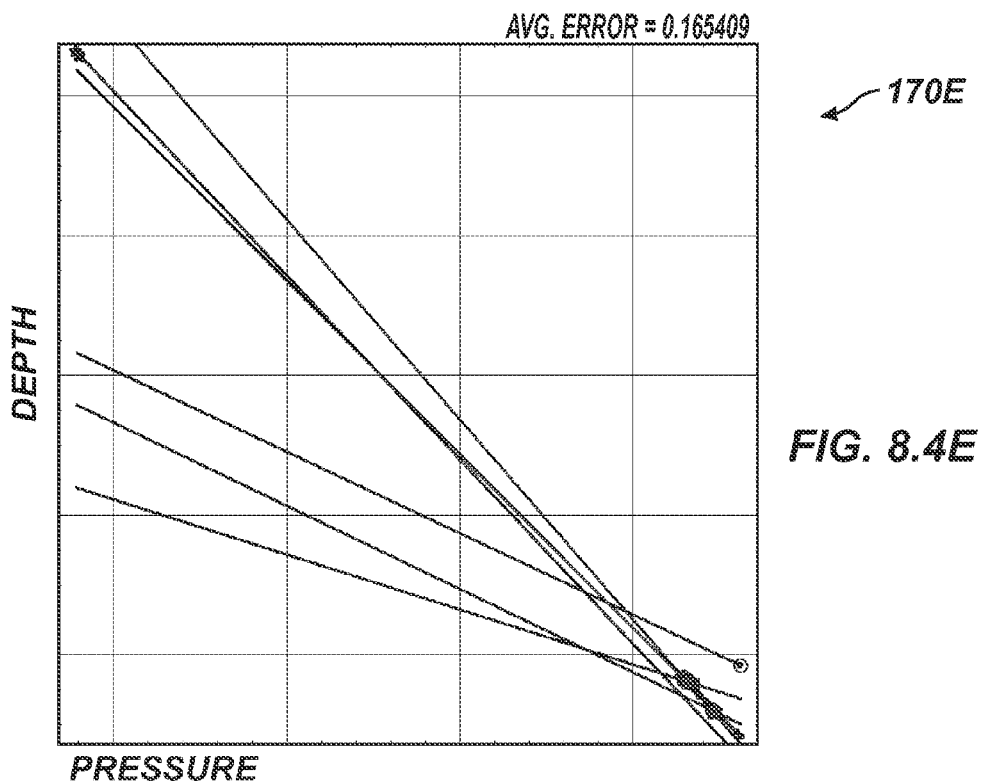
FIG. 8.4E
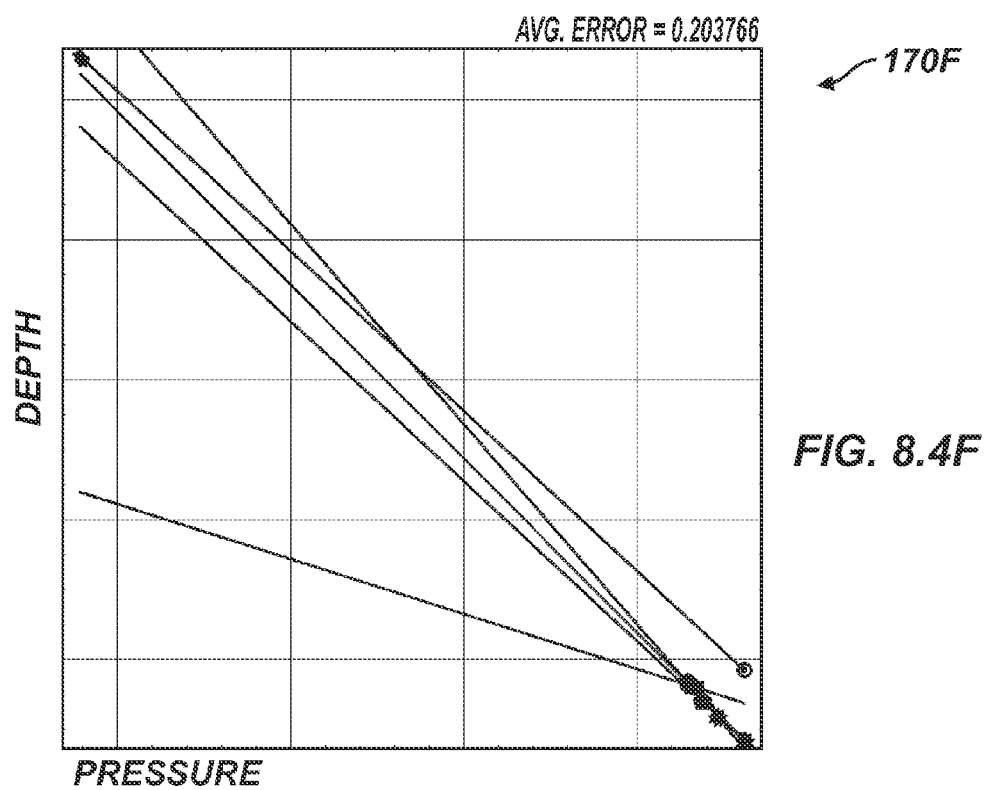
FIG. 8.4F

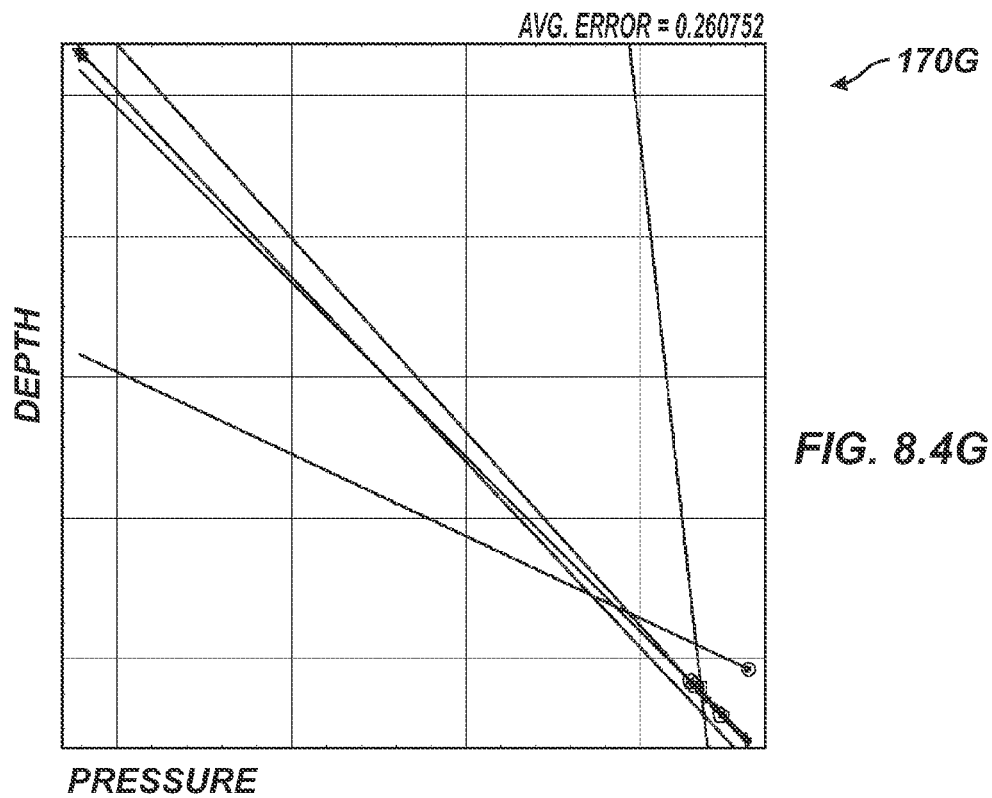
FIG. 8.4G
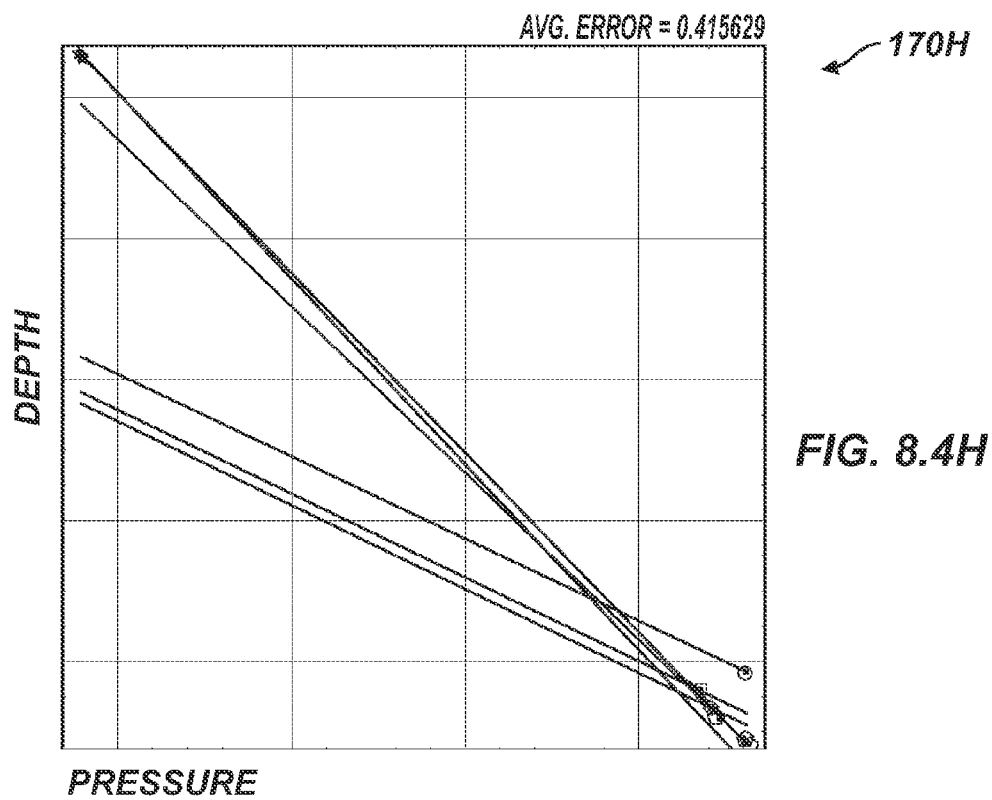
FIG. 8.4H

CLUSTERING PROCESS FOR ANALYZING PRESSURE GRADIENT DATA

CROSS-REFERENCE TO RELATED APPLICATIONS

This is a continuation of U.S. application Ser. No. 13/274,160, filed 14 Oct. 2011, which is incorporated herein by reference in its entirety.

BACKGROUND

In the oilfield industry, performing pressure testing in a borehole leads to a characterization of the formation in terms of the fluids present. Conceptually, pressure exhibits a linear dependency with respect to the depth of the formation, and the linear slope (gradient) of the pressure is indicative of the fluid type (e.g., oil, water, or gas). Therefore, discrete sampling of formation pressures at different formation depths can indicate where and what types of fluids are present in the formation.

Traditionally, human analysts interpret pressure gradients based on visual inspection of the sampled data. However, noise, undersampling, complexity, and other problems with the sampled data may render the manual interpretation difficult or ambiguous for the human analyst. Moreover, manual analysis of the data can be cumbersome, labor intensive, and/or prone to analyst bias.

Data of measurable physical properties can be analyzed in a number of ways. In particular, exploratory statistical methods, such as data clustering (grouping), can suggest patterns in the data that are otherwise unpredictable by an analyst. By classifying collected data into clusters, the cluster analysis can help analysts interpret the data, optimize a process (e.g., control an operation), and/or infer properties of interest.

Common forms of cluster analysis use the popular c-means clustering models. The c-means models cluster a batch of data points into c partitions (groups) and employ an iterative optimization (or alternating optimization) principle to minimize a clustering objective function, which incorporates a presumed clustering similarity measure. These clustering models output a set of points representative of their associated clusters (typically cluster centers) and a matrix that indicates the probability that a given point belongs to a given cluster.

The three general clustering algorithms for the c-means clustering models include hard c-means (also known as k-means), fuzzy c-means, and possibilistic c-means. In the hard c-means clustering algorithm, cluster partitions are crisp so that every point has a single certain cluster membership. In the fuzzy or possibilistic clustering algorithms, each point may have varying degrees of likelihood for belonging to each possible cluster.

For the purposes of background information, the following references discuss clustering algorithms, which may be referenced herein:

a. [Bezdek et al. 1978]: J. C. Bezdek and J. D. Harris, "Fuzzy Relations and Partitions: An Axiomatic Basis for Clustering," *Fuzzy Sets and Systems* 1, 112-127 (1978).
b. [Bezdek et al. 1981b]: J. C. Bezdek, C. Coray, R. Gunderson, and J. Watson, "Detection and Characterization of Cluster Substructure: I. Linear Structure: Fuzzy c-Lines," *SIAM J. Appl. Math.*, Vol. 40, 339-357 (1981).
c. [Bezdek et al. 1981b]: J. C. Bezdek, C. Coray, R. Gunderson, and J. Watson, "Detection and Characterization of Cluster Substructure: II. Fuzzy c-Varieties and Convex Combinations thereof," *SIAM J. Appl. Math.*, Vol. 40, 358-372 (1981).
d. [Bezdek et al. 1995]: J. C. Bezdek, R. J. Hathaway, N. R. Pal, "Norm-Induced Shell Prototype (NISP) Clustering," *Neural, Parallel and Scientific Computation*, Vol. 3, 431-450 (1995).
e. [Bezdek et al. 1999]: J. C. Bezdek, J. M Keller, R. Krishnapuram, N. R. Pal, "Fuzzy Models and Algorithms for Pattern Recognition and Image Processing," Kluwer, Dordrecht, in Press (1999).
f. [Botton et al. 1995]: L. Botton and Y. Bengio, "Convergence Properties of the K-means Algorithms, In G. Tesauro and D. Touretzky (Eds.) *Advances in Neural Information Processing Systems 7*," Cambridge, Mass., The MIT Press, 585-592 (1995).
g. [Hathaway et al. 1993] R. J. Hathaway and J. C. Bezdek, "Switching Regression Models and Fuzzy Clustering," *IEEE Transactions on Fuzzy Systems*, Vol. 1, 195-204 (1993).
h. [MacQueen 1967]: J. B. MacQueen, "Some Methods for Classification and Analysis of Multivariate Observations, *Proceedings of 5-th Berkeley Symposium on Mathematical Statistics and Probability*," Berkeley, University of California Press, 1:281-297 (1967).

The c-means clustering models assume point prototypes and the computed clusters under such models typically have a hyperellipsoidal or cloud-like structure that is implicitly defined. One clustering algorithm known in the art based on the hard c-means model is the k-means clustering algorithm mentioned previously. The k-means algorithm classifies or clusters multi-attribute objects (i.e., points) into a number (k) of groups based on a similarity measure or distance function between any two points. To do the grouping, the algorithm starts with a predefined number (k) of clusters randomly initialized and then follows an iterative local optimization scheme to minimize the sum of squared distances between each data point and its corresponding cluster centroid the cluster's data mean point). See [MacQueen 1967].

Although such traditional clustering assumes point prototypes, shape-driven clustering algorithms are also known that use other mathematical constructs, such as mathematical models or surfaces for cluster prototypes. In general, the shape-driven clustering algorithms can be divided into two categories: (1) algorithms that match the norm used in the distance or similarity function to the geometry of the individual clusters, and (2) algorithms that redefine the cluster prototype to assimilate the cluster shape information. Much of the optimization principles applied by the algorithms are based on the c-means clustering models. Any specialized treatment for each algorithm lies mainly in the proper choice of the prototype definition, the appropriate corresponding distance function, and possibly the objective function. Complexity of the iterative optimization steps depends on these choices. See [Bezdek et al. 1999].

As one example, the Gustafson-Kessel (GK) model is a fuzzy clustering algorithm that matches data to desired or expected cluster shapes. It performs shape matching using an adaptive distance norm that defines the similarity function while keeping the cluster prototypes as regular points. Hence, optimization is done with respect to an additional variable matrix used to adapt the distance norm. The shapes of the computed clusters are implicitly defined by the Eigen properties of the adaptive matrix used in the optimization. In particular, the GK model obtains hyperellipsoidal cluster shapes, which can also approximate lines and planes as these may be viewed as special limit cases of ellipsoids. See [Bezdek et al. 1999].

Another algorithm uses a fuzzy paradigm for clustering multidimensional data assuming r-dimensional flat surface prototypes, which are more formally known as linear manifolds or hyperplanes. Under this approach, the prototype optimization is done with respect to the independent vectors defining the directions of the hyperplane and a point belonging to the hyperplane. This optimization is done in addition to the fuzzy membership matrix included as part of the optimization problem, which is similar to point-prototype clustering described previously. A perpendicular offset (distance) is used as the similarity function. Variants of this approach allow prototypes to be convex combinations of hyperplanes. See [Bezdek et al. 1978]; [Bezdek et al. 1981a]; [Bezdek et al. 1981b]; and [Bezdek et al. 1999].

Surface ("shell") prototypes were devised for boundary detection applications, and several algorithms that implement such prototypes recognize spherical and elliptical cluster prototypes. Various distance functions may be defined and may yield a tradeoff between optimization complexity and solution accuracy. Other methods target quadric prototypes, which can be viewed as a generalization of shell clustering that includes forms of quadric surfaces. Similar to "shell" prototype clustering, the choice of the distance function may be critical to the complexity of the optimization procedure. See [Bezdek et al. 1999].

Another clustering algorithm uses prototypes that are shells of shapes defined by norm functions, hence norm-induced shell prototypes. The shells are formally represented by multidimensional closed/open balls of a given radius. The norm-dependent point-to-shell shortest distance is used along with a c-means-type optimization algorithm. Among the shell shapes implied by this norm-induced model are hyperspherical, hyperelliptical, squares, diamonds, etc. See [Bezdek et al. 1995].

Finally, a fuzzy c-regression clustering model assumes that a number of functional relationships exist among the dependent and independent variables and that clustering should seek to partition the data under the assumption that cluster prototypes conform to these presumed functional relationships or regression models. The distance function is tied to the measure of the model error; however, the latter is restricted to special class of models that satisfy a special property to assure global optimization when fitting a prototype through a cluster of points. The algorithm assumes the data exist in a pre-collected batch to be clustered into a fixed number of clusters prototyped by any of a fixed number of switching regression models. The algorithm employs the iterative optimization principle of the fuzzy c-means clustering model to compute the fuzzy partitions. See [Hathaway et al. 1993].

The subject matter of the present disclosure is directed to overcoming, or at least reducing the effects of, one or more of the problems set forth above.

SUMMARY

A clustering process automates the interpretation of data that characterizes a physical phenomenon of interest, such as pressure gradients (i.e., pressure vs. depth) of fluids in a formation. Other types of petrophysical data can be used, including but not limited to fluid density, fluid viscosity, formation temperature, flow rate, molecular concentration, petrophysical well logs, or other measurable variables. These measurable variables can be tied together via one or more mathematical relationships (e.g., linear, polynomial, logarithmic, etc.) governing the physical phenomenon (property) in question. For example, relationships, including but not limited to pressure verses depth, pressure verses temperature, viscosity versus flow rate, and the like, can be of interest for a given implementation. The disclosed clustering process exploits the presumed mathematical relationships that exist among the problem variables and computes data clusters that admit physical interpretation. The disclosed clustering process is not bound to any particular problem domain or to the number of variables to be clustered and their relationship types.

Using computer algorithms executing on a downhole processor, uphole computer, remote workstation, or the like, the clustering process can enumerate (within an allowed time period) a number of distinct solutions that may explain the collected data. Offering a multiplicity of solutions, the clustering process can then provide an analyst with a guideline on how to acquire further data samples to reduce or remove ambiguities, hence optimizing the sampling process. Additionally, the clustering process can make the analysis practically insensitive to data noise and outliers.

The clustering process is tailored to measurements in applications where clusters exhibit prototypes of known mathematical forms. As discussed herein, a prototype refers to a mathematical equation that explicitly describes one intrinsic relationship between the variables of an environment to be analyzed. For example, the two-dimensional data point measurements for a fluid's pressure gradient (pressure vs. depth) in a formation or borehole environment can be grouped together in a linear relationship, meaning that the prototype for the pressure gradient data is a line.

In general, the measurements in an environment to which the clustering process is applied need not simply be two-dimensional data points as in the pressure gradient application. Instead, the measurements can be multi-dimensional relating a number of variables for predicting properties in an environment. A cluster as used herein refers to an aggregation of measurements defined by a particular prototype.

The clustering process can be parameterized in two different ways by (1) imposing a predetermined number of clusters based directly on an analyst's input, or (2) imposing a hard constraint on an error statistic of interest without predetermining the number of clusters. In general, the error statistic may be more intuitive to define because it can be based on a quantifiable measurement error in the way the data is collected. Either form of the parameterized process can be employed offline on pre-collected data, or online (i.e., in real-time) by incrementally updating the cluster analysis as new data samples are collected. Depending on available computing resources, processor speeds, and application constraints, the clustering analysis can be utilized in real-time as each new measurement of the environment is acquired.

To refine the analysis, the clustering process can explicitly incorporate knowledge specific to the application of interest. For example, pressure gradient data of formation fluids may be expected to have certain characteristics that can be taken into consideration during the clustering process and later analysis. Therefore, the clustering process can automatically avoid computing clusters that are deemed physically impossible. Further, the clustering process can help detect data outliers by identifying clusters of data points that cannot be physically interpreted. Moreover, physical property estimation and sensitivity analysis can be performed with the aid of the clustering process by analyzing the quality of the fit of the prototypes to the measurement clusters.

The clustering process can be used for a number of purposes as discussed herein. To reemphasize, the process can identify data similarities/differences in wide ranging physical variables, can provide estimates of physical properties, can be used in sensitivity analysis, can help detect outliers, and can guide further data acquisition. These and other uses will be evident to one skilled in the art having the benefit of the present disclosure.

The foregoing summary is not intended to summarize each potential embodiment or every aspect of the present disclosure.

BRIEF DESCRIPTION OF THE DRAWINGS

FIG. 8.1A shows a real-life example of a pressure profile dataset from a formation.

FIGS. 8.1B through 8.1J show a set of possible pressure gradient solutions for the dataset in FIG. 8A.

FIG. 8.2A shows a second real-life example of a pressure profile dataset from a formation.

FIGS. 8.2B through 8.2D show a set of possible pressure gradient solutions for the dataset in FIG. 8.2A.

FIG. 8.3A shows a third real-life example of a pressure profile dataset from a formation.

FIGS. 8.3B through 8.3C show a set of possible pressure gradient solutions for the dataset in FIG. 8.3A.

FIG. 8.4A shows a fourth real-life example of a pressure profile dataset from a formation.

FIGS. 8.4B through 8.4H show a set of possible pressure gradient solutions for the dataset in FIG. 8.4A.

DETAILED DESCRIPTION

Figure 1:
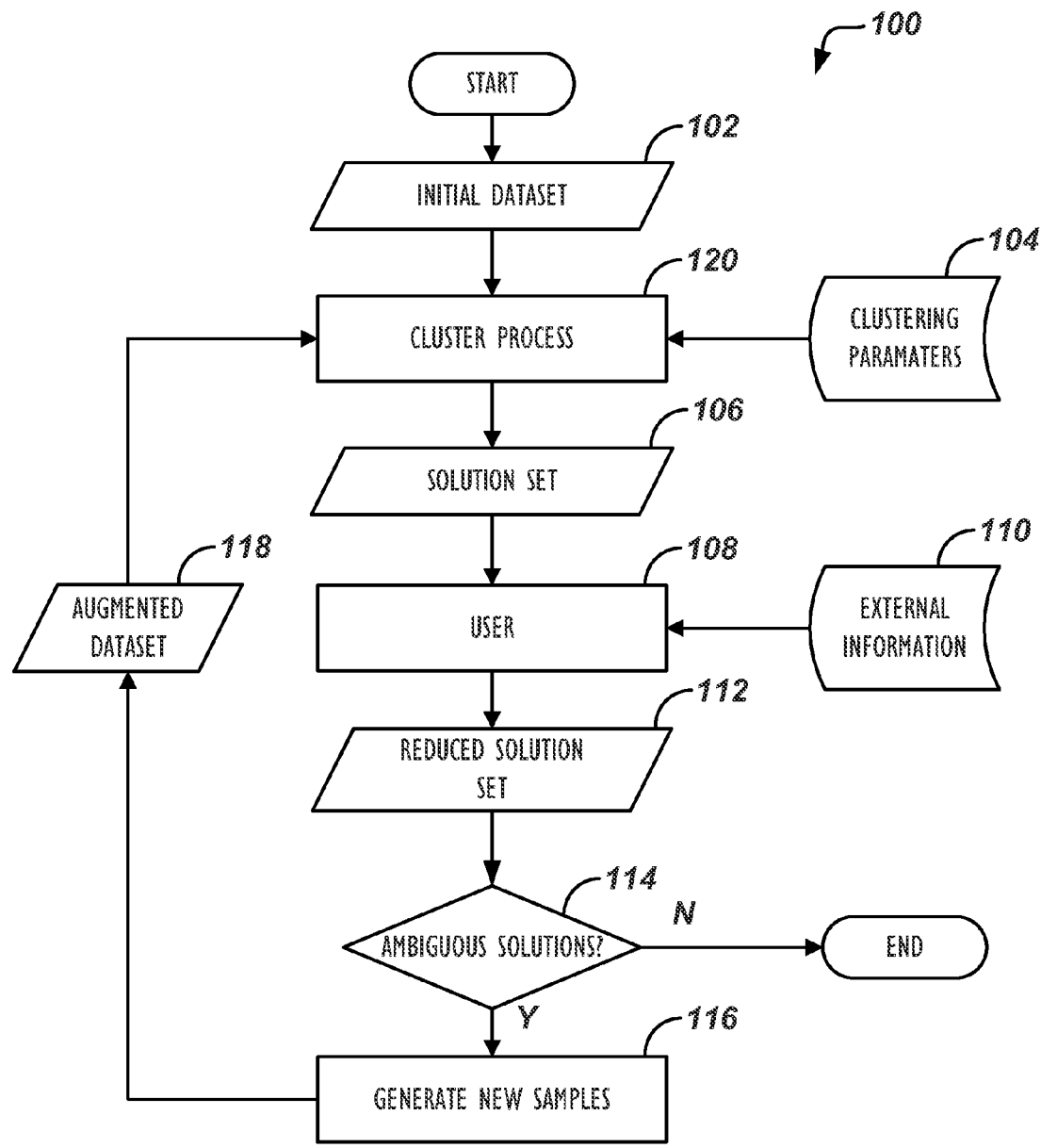
FIG. 1 shows an implementation of a clustering analysis of the present disclosure in flowchart form.

A data clustering process disclosed herein analyzes data for various types of applications. The data as described herein includes physical measurements of an environment. For convenience, the data and measurements may be referred to as "data points," but as will be apparent below, the measurements and data need not be two-dimensional.

The measurements of the environment can be mapped to multiple clusters (similarity groups), and each of the clusters can be modeled by a mathematical equation (data model), which can characterize an intrinsic relationship between the data within the given cluster. The data model for a cluster, which is referred to herein as a prototype, is correlated to an underlying physical state or property of the portion of the environment from which the data is sampled. Therefore, clustering the data sampled from the entire environment can reveal various physical states and properties present in the environment under exploration.

The clustering process autonomously partitions the sampled data (measurements) into clusters, but the process constrains the clustering to one or more particular prototypes imposed by the application at hand. In general, the prototype can take any mathematical form. In one implementation, the prototype is defined as a line representing a linear relationship between two variables in an environment.

Given a set of data points or measurements, the clustering process employs a local optimization scheme to provide multiple (locally optimal) solutions that potentially explain (i.e., interpret) the dataset. In turn, the multiple solutions can help analysts determine how to acquire more data samples to reduce ambiguity in the data interpretation or to ideally converge to a unique solution. The reverse is also achievable. If the clustering results for the data show sufficient clarity, the amount of sampling performed can be reduced. To achieve greater autonomy, additional application-specific constraints can be incorporated into the clustering process without requiring any modification to the general clustering framework. In other words, such constraints are taken into account as add-ins.

As noted previously, the prototype in one of the more direct implementations is defined as a line representing a linear relationship between two variables in an environment. One example that conforms to such an implementation is the pressure of a fluid as a function of formation depth. Therefore, in one example application, a formation tester tool in a borehole obtains pressure data at discrete depths within a formation. In turn, the pressure data can be mapped onto a set of clusters where each cluster is modeled by a linear relationship or line as the underlying prototype. Because the slope of any pressure gradient is indicative of the type of fluid (e.g., gas or oil), cluster analysis of pressure and depth data from the formation tester tool can then reveal the different types of fluids that are present in the formation surrounding the borehole and their locations (i.e., depths).

In later sections of the present disclosure, the clustering process is used to automatically classify reservoir pressure gradient data for illustrative purposes. The prototype of the reservoir pressure gradient is inherently linear as noted previously. Therefore, the two-dimensional data points for the formation pressure and depth and the linear pressure gradient for formation fluid in such an application are amenable to illustration in the present disclosure.

With the benefit of the present disclosure, however, it will be appreciated that the clustering process can be applied to a variety of properties and environments other than pressure gradient data obtained from a formation tester in a borehole environment. In general, the process can be applied to d-dimensional data points and d-dimensional prototypes, such as curves, surfaces, etc. Moreover, the disclosed clustering process can be used with one fixed type of prototype (e.g., lines for pressure gradient data) as well as with mixed-type prototypes (e.g., exponential and polynomial curves).

A. Clustering Analysis

FIG. 1 shows an overview of a clustering analysis 100 illustrated in flowchart form. The clustering analysis 100 assumes an initial dataset 102 has been sampled in the environment. From this, the initial dataset 102 is fed to a parameterized cluster process 120, and a user-defined set of parameters 104 determines the particular implementation of the process 120 to deploy and its configuration.

The cluster process 120 is described in more detail later, but is briefly described here. Initially, the cluster process 120 presumes one or more cluster prototypes that explicitly define the general character of the clustering being sought. The choice of the cluster prototypes stems from the particular application at hand, and the equations defining the cluster prototypes govern the intrinsic relationships between the system variables and measured data. For example, pressure gradient data for fluids in a formation mentioned previously exhibit a linear relationship between pressure and depth, and this relationship suggests that a linear (i.e., line-shaped) prototype could be used for clustering the pressure gradient data. Accordingly, details of the cluster prototypes are part of the clustering parameters 104 used to direct the cluster process 120.

Based on the parameters, the cluster process 120 partitions (clusters) data points (i.e., physical measurements) in the dataset 102 by optimizing a clustering criterion. In general, the clustering criterion refers to a quality measure for a given candidate clustering solution. Here, the clustering criterion is based on a given similarity measure between any set of data points.

Although traditional clustering methods use a similarity measure between any two individual data points (point-prototype clustering), the disclosed cluster process 120 defines its similarity measure collectively for a whole aggregation of data points (i.e., how similar a collection of points are as a whole). This collective similarity measure for an aggregation (cluster) of data points is evaluated with respect to a given prototype (i.e., the underlying mathematical relationship between the problem variables). In this way, the cluster process 120 is prototype-driven and provides an explicit way of defining the shape of clusters.

The objective of the cluster process 120 is to compute one or more clustering solutions that optimize the clustering criterion. To realize this, the iterative optimization principle of the popular k-means algorithm is exploited and adapted to the prototype-driven clustering paradigm disclosed herein. To do this, the k-means algorithm is extended to handle generalized prototypes (i.e., more intricate data models). By implication, the clustering criterion is also adapted to capture the fundamental scaling in the prototype definition and the collective similarity measure.

In one embodiment analogous to the k-means algorithm, a first embodiment of the cluster process 120 requires the specific number of clusters for the solution be input as one of the initial parameters 104. In another embodiment, the cluster process 120 automates the choice of the number of clusters for the solution by imposing hard constraints on one or more error statistics. (As discussed later, the constraints on the error may be chosen based on the given application.) In either embodiment, additional application-dependent constraints can further guide the cluster process 120 without modifying the general clustering framework. An instance of this is discussed later in an example where the cluster process 120 analyzes pressure gradient data from a formation.

Because the cluster process 120 is a randomized local optimization method, different locally optimal solutions (outputs) may be obtained from different runs (randomizations) of the cluster process 120 on the same dataset 102. A set of distinct solutions 106 can then be generated within an allowed time period, which can also be part of the parameters 104. The solution set 106 may be further refined by the user 108, who may disregard solutions that are not physically interpretable. Furthermore, should external information 110 be available (i.e., data outside the scope of the particular application of the process 120), then this information 110 may be used to further reduce the solution.

A reduced solution set 112 obtained is subsequently analyzed to determine whether the solutions are ambiguous (Decision 114). Ideally, the cluster analysis 100 is completed with as few solutions as possible so that the interpretation is rendered as unequivocal as possible. Yet, the analysis 100 may produce an ambiguous solution set (i.e., having two or more different clustering outputs) that represents the dataset at hand. Thus, the cluster analysis 100 is complete if the reduced solution set 112 is not ambiguous. In the event of an ambiguous solution set 112, however, further data samples 116 can be acquired so that an augmented dataset 118 can better capture the reality of the environment being studied. The augmented dataset 118 is fed to the cluster process 120, and the process 120 is iterated as needed.

To conserve computational resources, the analyst 108 can set a maximum number of solutions and a time threshold in which to compute solutions by performing repeated randomized runs of the cluster process 120. The clustering analysis 100 is terminated when enough solutions are found, the time bound is reached, or when no new (i.e., non-duplicate) solutions can be determined.

The cluster process 120 may be employed in dual fashion either online or offline. Operated online (i.e., in real-time), the generation of new data samples 116 may be performed one point at a time (as a new data sample becomes available) to allow the process 120 to incrementally update each of the current clustering solutions 106, which is more efficient as there are no unnecessary recalculations. Depending on the time difference between data samples (time tick), offline analysis can also be performed on collected data as in the case with the initial dataset 102 at the start of the analysis 100.

B. Prototype-Driven Clustering Process

Discussion now turns to describing the inner workings of the cluster process (Block 120 of FIG. 1). As mentioned briefly in the preceding section, there are two embodiments of clustering algorithms for performing the disclosed cluster process 120. A subset of the cluster parameters 104 determine which embodiment will be called upon. The discussion in this section pertains to the first embodiment i.e., the prototype-driven cluster process 120-1, which is shown in flowchart form in FIG. 2.

Figure 2:
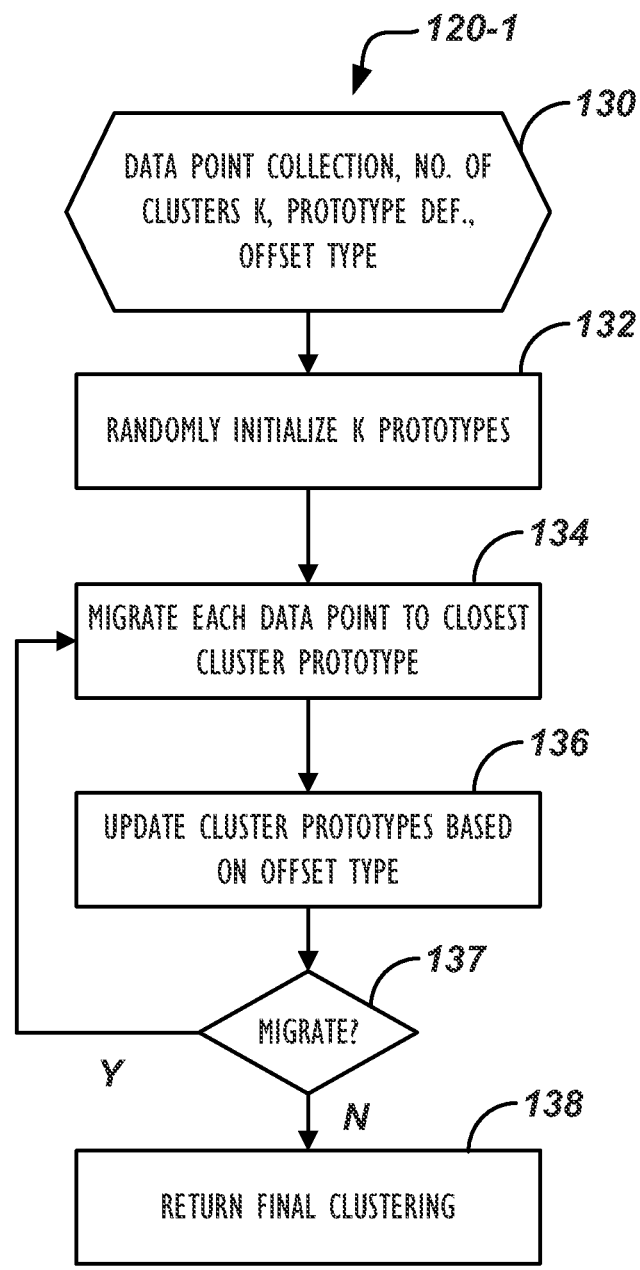
FIG. 2 shows a prototype-driven form of a cluster process for the disclosed analysis.

As can be seen, the prototype-driven cluster process 120-1 in FIG. 2 has a parallel with the k-means algorithm because this embodiment of the disclosed process 120-1 is based on the same iterative optimization principle. Yet, this first embodiment of the disclosed process 120-1 has fundamental differences from the k-means algorithm. Notably, the disclosed cluster process 120-1 is more flexible in defining cluster prototypes and introduces the new notion of a collective similarity measure. K-means uses the centroid of data points as the cluster prototype and uses the Euclidean distance between any two data points as the similarity measure.

Again, a cluster prototype disclosed herein is a mathematical data model that fits the distribution of data points (i.e., physical measurements) within a cluster, and the prototype is not bound to any particular mathematical shape or form. With this definition, a clear distinction can be drawn with respect to the clustering performed in the standard k-means where a cluster centroid (prototype) has the same domain as any data point to be analyzed and clustered.

Along with the scaled prototype definition used herein, the similarity measure of the disclosed process 120-1 is also different. As noted previously, similarity is assessed collectively for a whole aggregation of data points as opposed to the traditional approach of viewing similarity as a binary operation on any two data points. Here, the measure of how similar a point is to a given data cluster is assessed with respect to the cluster prototype (mathematical relationship). One useful similarity measure is the distance from one data point to the prototype. This can be assessed in two different ways in the disclosed process 120-1. For example, the similarity measure can be the Euclidean distance from a given data point to the prototype (i.e., the perpendicular offset between the data point and the prototype's curve). Alternatively, the similarity measure can be the difference in the dependent variable between that of the data point and that of the prototype at the same input (i.e., independent variable). In other words, this similarity measure may be the vertical offset between the data point and the prototype's curve.

For instance, the perpendicular offset from a two-dimensional data point to a linear two-dimensional prototype (line) is the Euclidean point-to-line distance between them. On the other hand, the vertical offset is the absolute difference between the ordinate value (dependent variable) of the data point and the ordinate value of the prototype (data model) evaluated at the value of the independent variable of the data point. Thus, the offset type for the similarity measure in Block 130 is either the perpendicular or the vertical distance from one data point to the prototype's curve. Additional similarity measures may be considered in this context. For instance, the change in the data model (or prototype) induced by incorporating a new point into the cluster associated with the prototype in question may be another form of similarity measure.

The prototype-driven cluster process 120-1 of FIG. 2, which is one clustering embodiment that may be used to realize the analysis task of process 100, resembles the fuzzy c-regression clustering model. See [Hathaway et al. 1993]. The main distinction is that the disclosed process 120-1 uses crisp clustering as in k-means as opposed to the fuzzy clustering paradigm used therein.

In the prototype-driven cluster process 120-1 of FIG. 2, an offset type for the similarity measure is given, and a number of clusters (k) is assigned a priori. Therefore, the offset type and number of clusters form part of the input 130 in FIG. 2. (In the larger analysis 100 of FIG. 1, the input 130 lies within the parameter set 104.) The process 120-1 begins by randomly initializing k prototypes for the assigned number k of clusters for the solution (Block 132). (Again, the form of the prototypes is defined by the clustering parameters 104 in FIG. 1, and the prototypes may take any mathematical form, such as linear, polynomial, exponential, etc. as imposed by the application at hand.) Based on the similarity measure defined in terms of the given offset type in the input 130, each of the data points is assigned to the cluster prototype to which the data point is most similar (i.e., closest). This assignment process is captured in Block 134 in which each data point is migrated to (i.e., assigned to or associated with) its closest cluster prototype.

Following the data point's assignments, the randomly initialized prototypes are recomputed based on the distribution of the data points assigned to them (Block 136). Following this update, one or more data points may become more similar (closer) to a different prototype. All such data points are thereby migrated to their corresponding new clusters and assigned to the new prototype. If migration has occurred, the process sequence of assign-update-migrate iterates until no further migration is required (i.e., convergence has been attained). Whether to perform migration or not is decided in 137. Ultimately, the prototype-driven cluster process 120-1 terminates after outputting the final clustering (Block 138) when no further migration is needed. Convergence is guaranteed by virtue of the optimization principle realized by this process 120-1 as explained later.

Pseudo-code for a processor to implement the prototype-driven cluster process 120-1 may be as follows:

---

PROTOTYPE-DRIVEN CLUSTERING PSEUDO-CODE

Given the data point collection, number of clusters (k), prototype definition, and the offset type
Begin
    Randomly initialize k prototypes;
    Repeat
        Migrate each data point to its closest cluster prototype;
        Update cluster prototypes based on the offset type;
    Until no migration is needed
    Return final clustering;
End

---

Figure 3A:
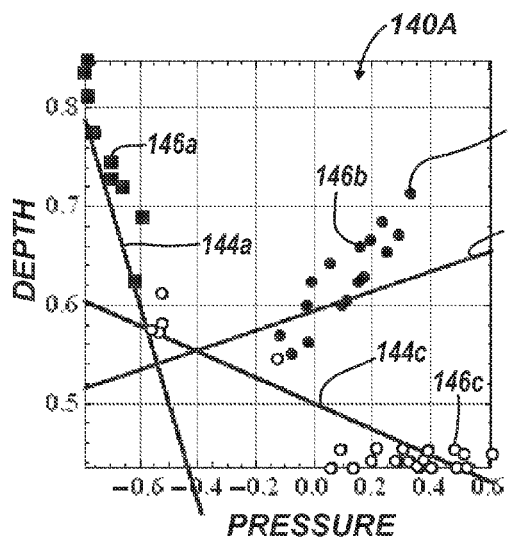
FIGS. 3A-3D show exemplary data points and prototypes during the prototype-driven clustering process of FIG. 2.
Figure 3B:
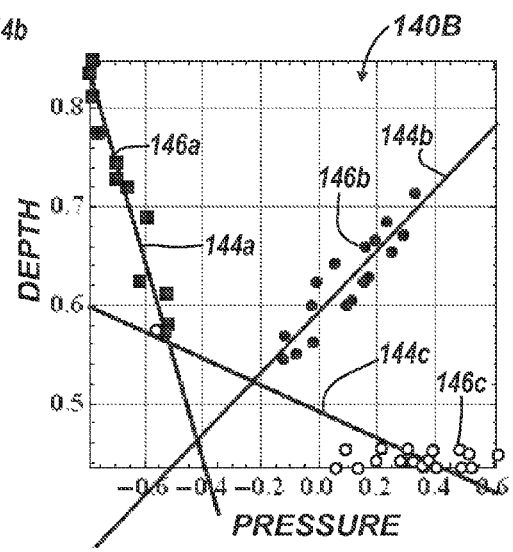
Figure 3C:
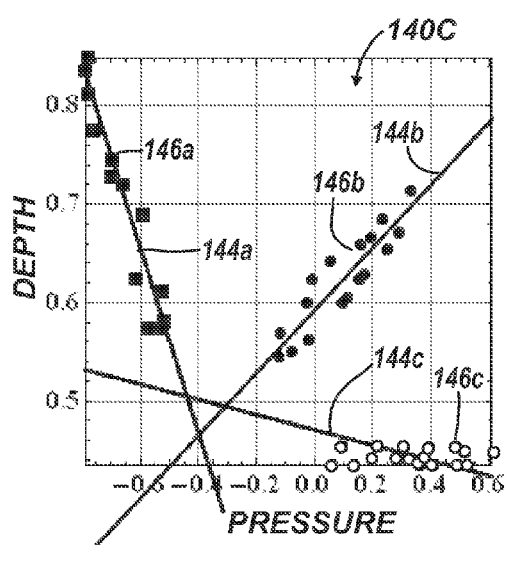
Figure 3D:
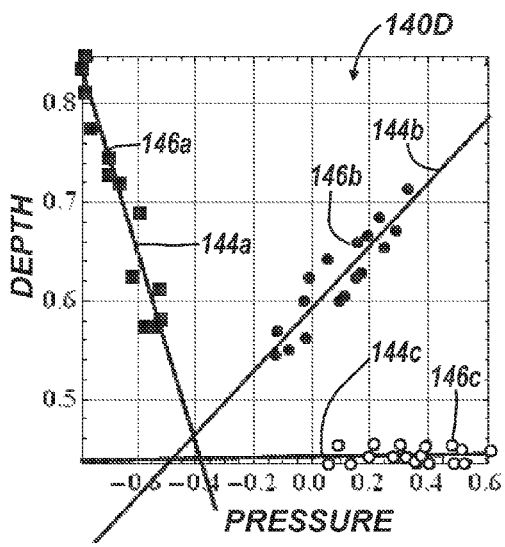

An example of this prototype-driven cluster process 120-1 is illustrated in FIGS. 3A-3C. For simplicity and without loss of generality, a two-dimensional data point example is used with linear prototypes (lines). As discussed earlier, this example may conform to pressure gradient data sampled from a formation tester tool as in FIG. 6 below. (Recall that the pressure gradient data require linear prototypes, as the pressure is linearly dependent with the depth.) Actual datasets and their solutions for the example application of pressure gradients described in this disclosure are shown in a later section.

As shown in FIGS. 3A-3D, the number of clusters is prefixed to three so that three prototypes 144 are initialized. In terms of the pressure gradient application, this would mean that three fluid compartments are anticipated in the formation being studied. That assumption may or may not be correct for a given input dataset, but repeated processing with other prefixed numbers of clusters can guide the user to choose an appropriate set of solutions. (In the second embodiment of the cluster process 120-2 (see FIG. 4 discussed later), the choice of the number of clusters is automated).

In this example, the prototype-driven cluster process 120-1 has taken four iterations to converge to the final solution for the particular run shown in the graphs 140A-D. More or less iterations may be required depending on the initialization and the complexity of the dataset. In particular, the graph 140A (FIG. 3A) shows the set of data points 142 and three randomly chosen linear prototypes 144a-c that have been initialized. Performing the needed migrations and the necessary prototype updates of the process 120-1 of FIG. 2, the clustering output transforms into the graph 140B (second iteration in FIG. 3B). In this example, updating the prototypes 144a-c means fitting a best line through every cluster 146a-c of data points 142. (Although a best line fit is disclosed abstractly in context to this simplistic example, appropriate techniques can be used for computing the linear prototypes (e.g., simple linear regression, linear/quadratic programming, or other optimization methods), depending on the application and the required constraints as one skilled in the art will appreciate.)

The third iteration (FIG. 3C) is shown in graph 140C, and the fourth iteration (FIG. 3D) is shown in graph 140D. By observing the data points 142 in the clusters 146a-c and their closest prototypes 144a-c, it is easy to see that no further migration is needed and thus convergence is attained. In the end, the converged prototypes 144a-c in FIG. 3D would constitute one possible solution to the given set of data points 142. The slope, arrangement, and other features of the prototypes 144a-c can indicate details about the environment, such as the types of fluids in the borehole.

This simple example in FIGS. 3A-3D is provided only to illustrate the basic iterative steps for one particular run. Had the dataset of data points 142 been more complicated, different runs might reveal that additional solutions fit well to the dataset at hand. In the case of the pressure gradient application, having multiple clustering solutions that interpret the given dataset would suggest that further pressure samples must be taken so that conclusive interpretation can potentially be made. The repeated process of acquiring more samples to refine the solution set provides a systematic framework for data sampling that can eliminate ambiguity to arrive at a conclusive interpretation. With such an approach, only data samples needed to resolve the ambiguities need to be acquired, which is beneficial to field operations.

As noted previously, the prototype-driven cluster process 120-1 can be repeated with different numbers of clusters k and randomly initialized prototypes to develop additional solutions for the data points 142. In the end, an analyst (108; FIG. 1) can manually analyze the various solutions to determine those that best explain the problem at hand and discard any cluster solutions that are not physically possible. As discussed in future sections, additional automated processing can also be performed to incorporate domain knowledge to produce a more compact solution set 106. Again, such a solution set 106 might be further refined by the analyst 108 using external information 110 to produce a reduced set 112.

C. Formulation of the Cluster Process

Given the above description of the prototype-driven form of the cluster process 120, the discussion below formulates the cluster process 120 more formally, illustrates several design choices for the process 120, and shows how the process 120 converges.

The prototype-driven cluster process 120 takes as input a collection C of n d-dimensional data points i.e., $C = \{x_i \in \mathbb{R}^d, i=1 \ldots n\}$ and seeks to partition the collection C into k non-overlapping clusters i.e., $$C = \bigcup_{i=1 \ldots k} C_k \text{ and } C_i \cap C_j = \phi, \forall i \neq j.$$

Here, k is a non-zero positive integer input to the algorithm i.e., $k \in \mathbb{N}^*$.

To realize the above task, the clustering can be formulated as an optimization problem in which the prototype-driven clustering process 120 computes k partitions of the collection C in order to minimize a given objective function $F_C$ (clustering criterion). The objective function $F_C$ may be defined as follows:

$$F_C = \sum_{C_i \in C} \sum_{x_j \in C_i} (D(x_j, P(C_i)))^2$$

Here, the objective function $F_C$ is parameterized in terms of two functions $D(\bullet)$ (similarity function) and $P(\bullet)$ (prototype or data model). In other words, these parameters are independent of the algorithm itself and are only dictated by the application. Yet, computing the prototype (data model) P depends upon the type of offset chosen. The prototype function $P(C_i)$ denotes the prototype (data model) of a given cluster $C_i$ (i.e., the given partition or group of the data points). The similarity function $D(\bullet)$ denotes the distance or similarity function between a given point $x_j$ and a given prototype $P(C_i)$. In fact, the objective function $F_C$ can measure the sum of the squared distances from all data points to their corresponding prototypes (sum of all squares of the intra-cluster errors).

For an application described herein related to pressure gradient data, the prototype function $P(\bullet)$ is a two-dimensional linear model. Therefore, the prototype function $P(\bullet)$ can be computed as the best linear fit to the data distribution within the given cluster. The particular application may also require physical constraints on the parameters of the prototype (data model) function $P(\bullet)$.

For instance, in the pressure gradient application, the slopes of the prototype can only belong to well defined negative ranges. This is one instance where domain knowledge may be incorporated. To accommodate such constraints, computing the prototype (data model) function $P(\bullet)$ may be set up as a Quadratic Programming (QP) problem with the appropriate choice of the similarity function D. Alternatively, simple linear regression may be used while ignoring such constraints and leaving the decision up to the user (108; FIG. 1) to disregard solutions that do not satisfy the physical constraints.

The similarity function $D(\bullet)$ between a prototype and a data point can be chosen as the distance between them (i.e., the error residual of the data point with respect to the model). In one implementation as noted previously, the distance (or error residual) with respect to the prototype can be chosen as the vertical offset or perpendicular offset between a given data point and a linear prototype to which the data point is assigned. Using the perpendicular offset allows for an error-in-variables model. In the case of pressure gradient data, this would account for errors in depth measurements.

It has been shown that the regular k-means algorithm can be cast as a gradient descent optimization method. See e.g., L. Botton and Y. Bengio, "Convergence Properties of the K-means Algorithms, In G. Tesauro and D. Touretzky (Eds.) *Advances in Neural Information Processing Systems 7*," Cambridge, Mass., The MIT Press, 585-592 (1995). By implication, the first disclosed embodiment of the cluster process 120-1 follows an iterative local optimization approach to minimize the clustering criterion or objective function $F_c$. In each iteration of the algorithm, one property is maintained invariant. Namely, the objective function $F_c$ in iteration i+1 is smaller than or equal to that of iteration i for all $i \geq 1$ $(F_c)_{i+1} \geq (F_c)_i$. This characteristic of the clustering process 120-1 can be verified by observing that (1) any data point is always assigned to the cluster of the closest prototype and by observing that (2) the computed prototype minimizes the intra-cluster error. These two facts assure that the objective function $F_c$ is smaller from one iteration to the next. Termination or convergence of this iterative process is guaranteed because there is a finite number of k-partitions to search through. However, the practical number of required iterations is considerably less than the theoretical bound (total number of k-partitions).

D. Error-Constrained Prototype-Driven Clustering Process

Because the number of clusters is typically not known a priori, a derivative approach to the clustering process automates the choice of this parameter. To do this, the prototype-driven cluster process 120-1 discussed previously is reparameterized to implicitly control the number of clusters by forcing a maximum average error-per-cluster (error threshold). The error threshold can be defined based on an a priori quantification of the maximum expected error in measurements of the tool used to obtain the data points. As an alternative to the maximum average error, the maximum allowed variance or any other statistic of interest can be chosen for the same purpose.

Figure 4:
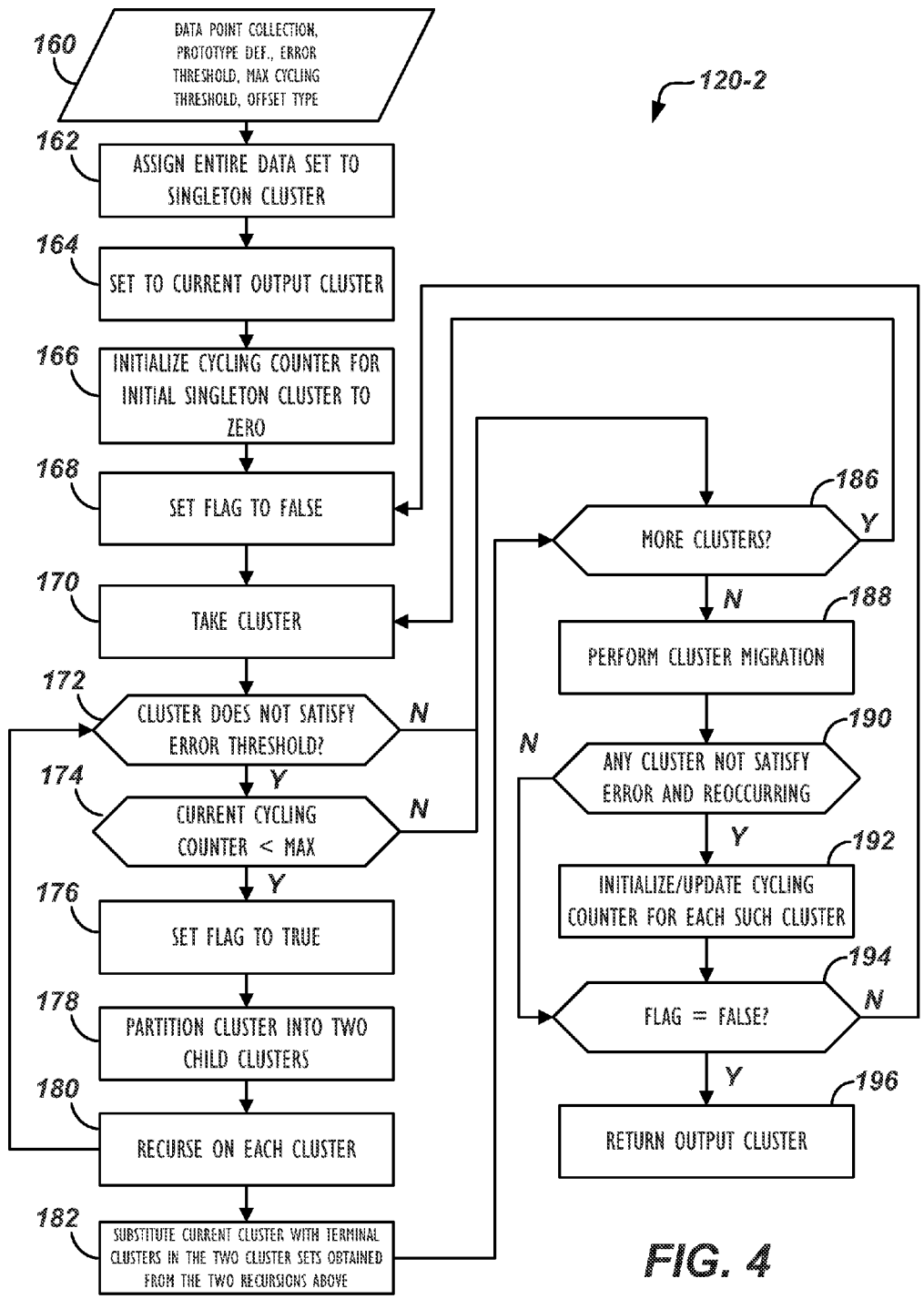
FIG. 4 shows an alternative form of the prototype-driven clustering process that is error-constrained.

Having such an error constraint, this second embodiment of the cluster process 120-2 in FIG. 4 is referred to as the error-constrained prototype-driven cluster process. In this analysis, the error-constrained prototype-driven cluster process 120-2 follows a top-down divisive approach to compute the clusters. Starting out with the entire dataset as a singleton cluster, the process 120-2 partitions this initial parent cluster into two child clusters by applying the first embodiment (prototype-driven) process 120-1 in which the number of clusters is set to two (2) clusters. If the chosen error statistic of any child cluster does not meet the defined threshold, then this process 120-2 is recursively applied to that cluster. This adaptively and successively divides the parent clusters to eventually yield several terminal child clusters that satisfy the error threshold.

To assure that the terminal child clusters constitute a solution that is a local minimizer for the clustering criterion ($F_c$), cluster migration is performed as in the first embodiment of the process, starting with the prototypes of the terminal clusters obtained. The recursive process thus continues until all locally optimal clusters satisfy the threshold, although it is possible to relax the threshold as described later.

1. Algorithm Details

As shown in flowchart form in FIG. 4, the error-constrained prototype-driven cluster process 120-2 takes as input (Block 160): (1) a collection of data points (i.e., physical measurements), (2) a prototype definition (data model) (e.g., linear as per the disclosed implementation), (3) an error threshold, (4) a maximum cycling threshold to control recursive iterations, and (5) an offset type (similarity function). Given this initial input, the error-constrained form of the process 120-2 follows a top-down divisive approach to compute the clusters as follows.

First, the process 120-2 assigns the entire dataset to an initial singleton cluster and sets it as the current output cluster (Blocks 162-164). A cycling counter for the initial singleton cluster is initialized to zero (Block 166), and repetitive processing begins (Blocks 168-194). The cycling counter for any cluster will be used to control the number of recursions, the need of which will become clear.

In the process 120-2, Blocks 168-194 are repeated until Block 194 evaluates a special flag to false, which indicates that computing the output cluster set is complete. Blocks 170-186 are reiterated for all currently computed clusters in the output cluster set. (Initially, the set is a singleton cluster, and other subject clusters are developed during further processing in recursive calls to this process.) Starting the repeated processing, each cluster in the output cluster set is successively taken (Block 170). For every cluster in the current output cluster set, the process 120-2 determines whether the cluster does not satisfy the error threshold (Decision 172) and whether its cycling counter is less than the maximum cycling threshold (Decision 174).

If either of these decisions is negative (current cluster satisfies error threshold or its cycling counter has reached maximum limit), then the current cluster does not need further processing, and the process 120-2 skips to the next cluster in the current output cluster set (Decision 186 and Block 170). If both of these decisions are affirmative (current cluster does not satisfy error threshold and its cycling counter has not yet reached the maximum limit), then the process 120-2 sets the flag to true indicating that one or more clusters need further processing (Block 176). Each such cluster then undergoes further processing as follows (Blocks 178-182).

Here, each cluster in the current output cluster set that satisfies both decisions 172 and 174 is partitioned into two locally optimal child clusters (Block 178) by applying the prototype-driven clustering form as described previously in FIG. 2 where the number of child clusters k is set to 2 (i.e., the original prototype is discarded and two new prototypes are randomly initialized and clustering is carried out as in process 120-1 with two required child clusters to replace the original parent cluster).

With the two child clusters created, the clustering process 120-2 of FIG. 4 recurses (i.e., reapplies the entire process) on each of the two child clusters (Block 180). Recursive cluster division will continue to be applied adaptively to Decisions 172 and 174, eventually yielding several terminal child clusters to the original problematic parent cluster. Successive cluster division terminates when the input cluster satisfies the error threshold (Decision 172) or when a maximum recursion is reached (Decision 174)—i.e., the cycling counter reached the threshold (more on this shortly).

Once a cluster has been recursively resolved, the process 120-2 concatenates the terminal clusters obtained from the original two child clusters and substitutes them into the output cluster set for their problematic parent cluster (Block 182). The process 120-2 then determines if there are more clusters to be handled (Decision 186), and repeats the steps (Block 170 through 182) needed to solve a cluster that satisfies both decisions of (172) and (174).

After completion of Block 186, all clusters in the output cluster set satisfy the threshold (with possible relaxation), but do not necessarily minimize the clustering criterion $F_c$. To assure that terminal child clusters in the entire output cluster set constitute a solution that is a local minimizer for the objective function $F_C$ (clustering criterion) as described previously, the process 120-2 performs a cluster migration (Block 188) as in the original prototype-driven analysis of FIG. 2 starting with the prototypes of the terminal clusters obtained.

Once migration is completed, the process 120-2 checks whether any of the updated clusters breaks the defined threshold and is reoccurring (Decision 190). For every such cluster, the cycling counter is incremented (Block 192). The migration operation (Block 188) may cause the reoccurrence of one or more clusters that do not satisfy the threshold. This is because child clusters are optimal considering only the points in their direct parent cluster and not necessarily with respect to points within a parent cluster of a higher generation. The migration operation combines the children of all generations, which may cause one or more child clusters to equate back to their parent clusters, causing cycling. When cycling occurs as many times as the allowed threshold, the cluster being resolved is assumed terminal i.e., recursion is terminated at Decision (174), and the error threshold is thus relaxed (a more detailed discussion of this situation will follow).

The cluster process 120-2 continues until the flag indicates that no more processing is needed (Decision 194). In the end, an output cluster set constitutes one possible solution. As mentioned in the cluster analysis 100 illustrated in FIG. 1, repeated application of cluster process 120-2 can be performed on the same original input data points to possibly obtain additional solutions 106 and hence guide further data sampling as discussed previously. A running-time bound and a maximum desired number of solutions can be provided in the clustering parameters 104. In the pressure gradient application, this offers a way of guiding further sample data acquisition from the borehole (i.e., which depths to sample from to reduce the multiplicity of the solution).

Figure 5A:
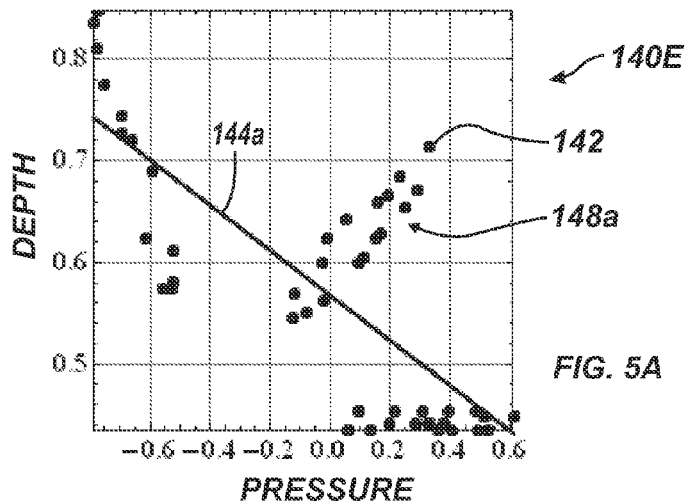
FIGS. 5A-5C show exemplary data points and prototypes during the prototype-driven error-constrained cluster process of FIG. 4.
Figure 5B:
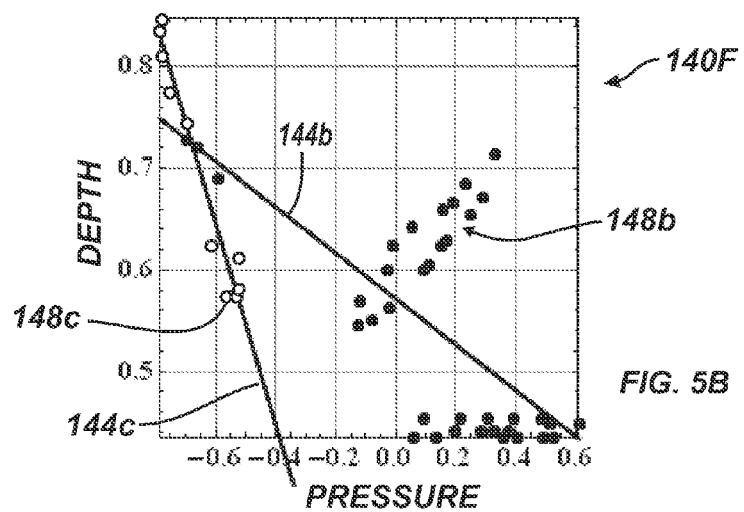
Figure 5C:
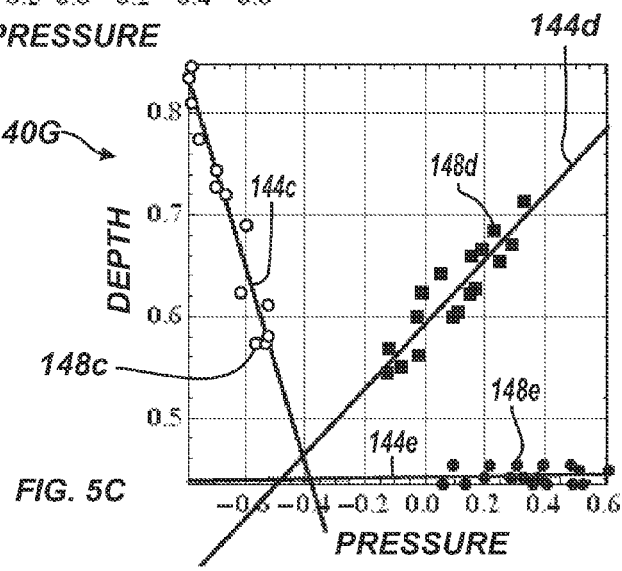

For illustrative purposes, FIG. 5A shows a synthetic example for the error-constrained prototype-driven clustering just described. Graph 140E shows two-dimensional data points 142 and a linear prototype 144a, which conform to the type of data in the pressure gradient application. In this graph 140E, the output cluster set is initialized as a singleton cluster 148a having the entire input data collection. In the graph 140F of FIG. 5B, two locally optimal "child" clusters 148b-c are shown associated with two prototypes 144b-c.

Assuming that the error threshold is not satisfied in graph 140F, further recursion (Block 180) is performed, which divides the problematic parent cluster (e.g., 148b) to produce a final output cluster set (Block 196). For example, the output cluster set in graph 140G has clusters 148c-e after a final cluster migration has been performed converging to the prototypes 144c-e.

Pseudo-code for a processor to implement this error-constrained prototype-driven form of the cluster process 120-2 in FIG. 4 can be represented as follows:

---
ERROR-CONSTRAINED PROTOTYPE-
DRIVEN CLUSTERING PSEUDO-CODE
---

Given a data point collection, a prototype definition, a threshold on error statistic, a threshold on maximum cycling, and an offset type
Begin
    Compute Initial Singleton Cluster;
    Initialize output cluster set to the above singleton cluster;
    Initialize a cycling_counter of the above cluster to zero;
    Repeat
        Set flag to false;
        For all clusters in the output cluster set
            If current cluster does not satisfy the error-statistic threshold
                and the current cluster's cycling_counter is less than max_cycling threshold
            then
                Set flag to true;
                Partition current cluster into 2 child clusters;
                Recurse on each cluster;
                Substitute current cluster with the terminal clusters in the two cluster sets obtained from the two recursions above;
            End if
        End for
        Perform cluster migration;
        If any cluster does not satisfy the error-statistic threshold and is re-occuring
        Then
            Initialize/Update cycling_counter for each such cluster;
        End if
    Until Not Flag;
    Return output cluster;
End 2. Threshold Relaxation in Error-Constrained Prototype-Driven Clustering As noted previously, the error-constrained prototype-driven cluster process 120-2 of FIG. 4 can cycle through locally optimal solutions that do not satisfy the arbitrary user-defined error threshold. Cycling can occur between the step of dividing clusters (Block 178; FIG. 4) and the step of associating (migrating) points to clusters (Block 188; FIG. 4). Because cluster division is a randomized process in which random prototypes are initialized for the two children, cycling may be avoided by repeating these two steps.

Yet, cycling may still persist. Therefore, the process 120-2 of FIG. 4 maintains a cycling counter as in Block 192. If cycling persists for more than a fixed number of times (Decision 174), then the threshold may be relaxed by accepting the current error and terminating the division process for the relaxed cluster. Accordingly, the process 120-2 may simply terminate after decision 190 in FIG. 4 and can keep the relaxed cluster in the cluster set for the solution. In practice, the need for threshold relaxation may be rare, and the margin of relaxation may often be insignificant.

E. Online (Real-Time) Version of Cluster Processes

In the previous discussion of the prototype-driven and the error-constrained prototype-driven forms of the cluster process 120, data points are assumed to have been collected and stored offline. As many applications will require real-time processing, scaling these offline methods to the online (real-time) paradigm can be useful. Thus, the disclosed process 120 can be made to analyze data points online (i.e., in real-time) as the data is being sampled from the environment (e.g., reservoir formation).

To scale to the online mode, the process 120 updates the currently determined clusters incrementally as each new data point is sampled. For the prototype-driven clustering of FIG. 2, the process 120-1 begins with k empty clusters at time t=0. The prototype for each empty cluster can be chosen at random without inducing any error. As each new data point arrives, it is placed in the cluster whose prototype is closest. Then, the cluster migration is performed. For all time ticks t>0, the process is deterministic. Only the initialization at time t=0 is randomized. Each different initialization gives a different solution.

Pseudo-code for the online version of the prototype-driven clustering process 120-1 is as follows:

---
ONLINE PROTOTYPE-DRIVEN
CLUSTERING PSEUDO-CODE
---

Given the number of clusters, the offset type, current prototypes/clusters, and new sample point
Begin
    Place the new point in the closest cluster;
    Perform cluster migration;
    Return final clustering;
End For the error-constrained prototype-driven process 120-2 of FIG. 4, a singleton empty cluster is first chosen along with a random prototype before data points are collected and analyzed. Again, any random prototype is guaranteed to fit an empty cluster without any error. Incrementally at every time tick, each new data point is assigned to its closest cluster. The prototype of the corresponding cluster is updated, and the cluster migration is performed. When any cluster error breaks the threshold, the divisive process 120-2 outlined in FIG. 4 is performed until convergence occurs as described previously.

Pseudo-code for the online version of the error-constrained prototype-driven clustering process 120-2 is as follows:

---

ONLINE ERROR-CONSTRAINED PROTOTYPE-
DRIVEN CLUSTERING PSEUDO-CODE

---

Given a threshold on error statistic, the offset type, current
    prototypes/clusters, and new sample point
Begin
    Place the new point in the closest cluster;
    Perform cluster migration;
    Apply the error-constrained prototype-driven clustering with the
        cluster-set from above as the initial cluster-set;
    Return final clustering from above step;
End

---

F. Incorporating Domain Knowledge into Cluster Process

As described previously, one way to incorporate domain knowledge into the cluster process 120 is to use the constraints in the prototype definition (data model)—e.g., the pressure gradient application may call for the linear slopes of the prototypes to have only well defined negative values. Below are some examples of ways in which application-dependent information can be used to refine the solutions produced with the clustering analysis 100 and process 120 disclosed herein. The example of incorporated domain constraints discussed here pertains particularly to the pressure gradient application briefly mentioned. Before formalizing the domain constraint problem and how it is resolved, however, we first elaborate on the pressure gradient application.

1. Example Application

Figure 6:
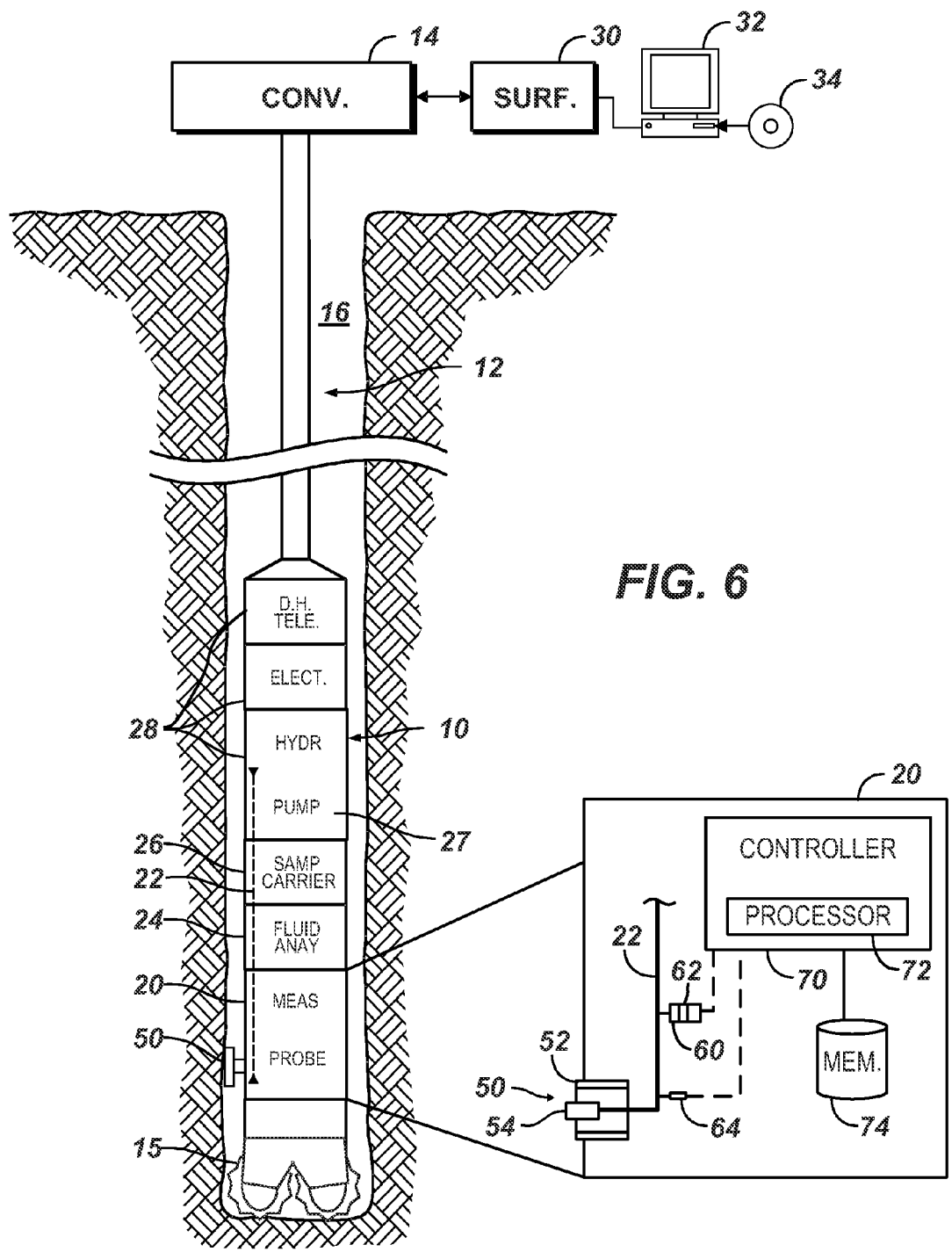
FIG. 6 illustrates one application for the disclosed cluster process used in the analysis of pressure gradient data obtained with a formation-testing tool in a borehole.

FIG. 6 shows one application for employing the clustering analysis 100 to analyze pressure gradient data. In this application, a downhole tool 10 analyzes discrete pressure measurements from a formation. In FIG. 6, a conveyance apparatus 14 at the surface deploys the downhole tool 10 in a borehole 16 using a drill string, a tubular, a cable, a wireline, or other component 12.

The tool 10 can be any tool used for wireline formation testing, production logging, Logging While Drilling/Measurement While Drilling (LWD/MWD), or other operations. For example, the tool 10 as shown in FIG. 6 can be part of an early evaluation system disposed on a drill collar of a bottomhole assembly having a drill bit 15 and other necessary components. In this way, the tool 10 can analyze the formation fluids shortly after the borehole 16 has been drilled.

In use, the tool 10 obtains pressure data at various depths in the borehole 16 to determine formation pressures in various zones. To do this, the tool 10 has a probe 50, measurement device 20, and other components for in-situ sampling and analysis of formation fluids in the borehole 16. The pressure data is recorded in a memory unit 74, communicated or telemetered uphole for processing by surface equipment 30, or processed locally by a downhole controller 70. Each of these scenarios is applicable to the disclosed clustering process.

Although only schematically represented, it will be appreciated that the controller 70 can employ any suitable processor 72, program instructions, memory 74, and the like for achieving the purposes disclosed herein. The surface equipment 30 can be similarly configured. As such, the surface equipment 30 can include a general-purpose computer 32 and software 34 for achieving the purposes disclosed herein.

The tool 10 has a flow line 22 that extends from the probe 50 and measurement section 20 through other sections of the tool 10. The probe 50 obtains fluids from the formation. Any suitable form of probe 50 can be used. For example, the probe 50 can have an isolation element 52 and a snorkel 54 that extend from the tool 10 and engage the borehole wall. A pump 27 lowers pressure at the snorkel 54 below the pressure of the formation fluids so the formation fluids can be drawn through the probe 50. During this process, sensors in the tool 10 can determine when the drawn fluid is primarily formation fluids. At this point, components such as valves, channels, chambers, and the pump 27 on the tool 10 operate to draw fluid from the formation that can be analyzed in the tool 10 and/or stored in a sample chamber 26.

Because the intention is to determine formation fluid properties, obtaining uncontaminated fluids with the probe 50 is important. The fluid can be contaminated by drilling fluids because the probe 50 has made a poor seal with borehole wall. For example, the fluid can contain hydrocarbon components (solid, liquid, and/or gas) as well as drilling mud filtrate or other contaminants. The drawn fluid flows through the tool's flow line 22, and various instruments and sensors in the tool 10 analyze the fluid.

For example, the probe 50 and measurement section 20 can have sensors that measure various physical parameters (i.e., pressure, temperature, etc.) of the fluid, and a measurement device, such as a spectrometer or the like, in a fluid analysis section 24 can determine physical and chemical properties of oil, water, and gas constituents of the fluid downhole. Eventually, fluid directed via the flow line 22 can either be purged to the annulus or can be directed to the sample carrier section 26 where the samples can be retained for additional analysis at the surface.

Additional components 28 of the tool 10 can hydraulically operate valves and other elements within the tool 10, can provide control and power to various electronics, and can communicate data via wireline, fluid telemetry, or other method to the surface. Uphole, surface equipment 30 can have a surface telemetry unit (not shown) to communicate with the downhole tool's telemetry components. The surface equipment 30 can also have a surface processor (not shown) that performs processing of the pressure gradient data measured by the tool 10 in accordance with the present disclosure.

In the operation of the probe 50, the tool 10 disposes at a desired location in the borehole 16, and an equalization valve (not shown) of the tool 10 opens to equalize pressure in the tool's flow line 22 with the hydrostatic pressure of the fluid in the borehole 16. A pressure sensor 64 measures the hydrostatic pressure of the fluid in the borehole. Commencing test operations, the probe 50 positions against the sidewall of the borehole 16 to establish fluid communication with the formation, and the equalization valve closes to isolate the tool 10 from the borehole fluids. The probe 50 then seals with the formation to establish fluid communication.

At this point, the tool 10 draws formation fluid into the tool 10 by retracting a piston 62 in a pretest chamber 60. This creates a pressure drop in the flow line 22 below the formation pressure. The volume expansion is referred to as "drawdown" and typically has a characteristic relationship to measured pressures.

Eventually, the piston 62 stops retracting, and fluid from the formation continues to enter the probe 50. Given a sufficient amount of time, the pressure builds up in the flow line 22 until the flow line's pressure is the same as the pressure in the formation. The final build-up pressure measured by the pressure sensor 64 is referred to as the "sand face" or "pore" pressure and is assumed to approximate the formation pressure. Eventually, the probe 50 can be disengaged, and the tool 10 can be positioned at a different depth to repeat the test cycle.

As the pressure testing is performed, the pressure data obtained from the formation with the probe 50 is combined with depth data obtained by any appropriate technique. Together the pressure and depth data form data points of the pressure gradient of the formation. After obtaining this data, the controller 70 can store the pressure gradient data in memory 74. The controller 70 can then process the data directly, and/or the data can be telemetered or conveyed uphole for processing with the surface equipment 30. In either case, once the data is ready for processing, the clustering analysis 100 according to the present disclosure is applied to the data points of the pressure gradient data to determine what fluids are present in the borehole 16.

2. Example Solutions of the Cluster Process

Figure 7A:
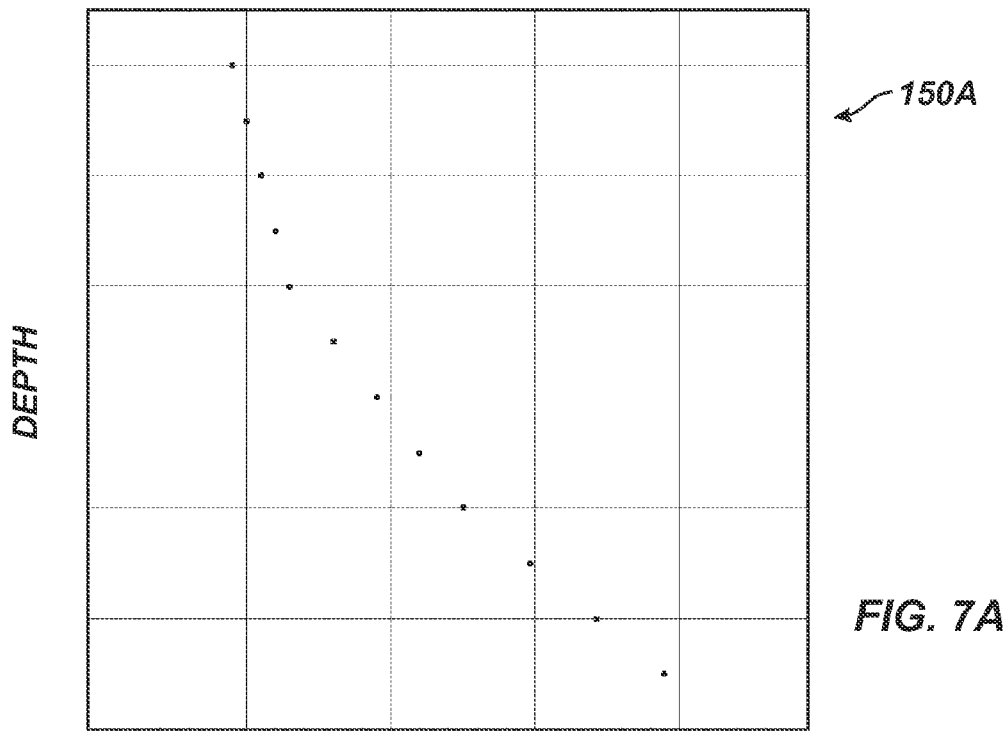
FIG. 7A shows a synthetic example of a pressure profile dataset.
Figure 7B:
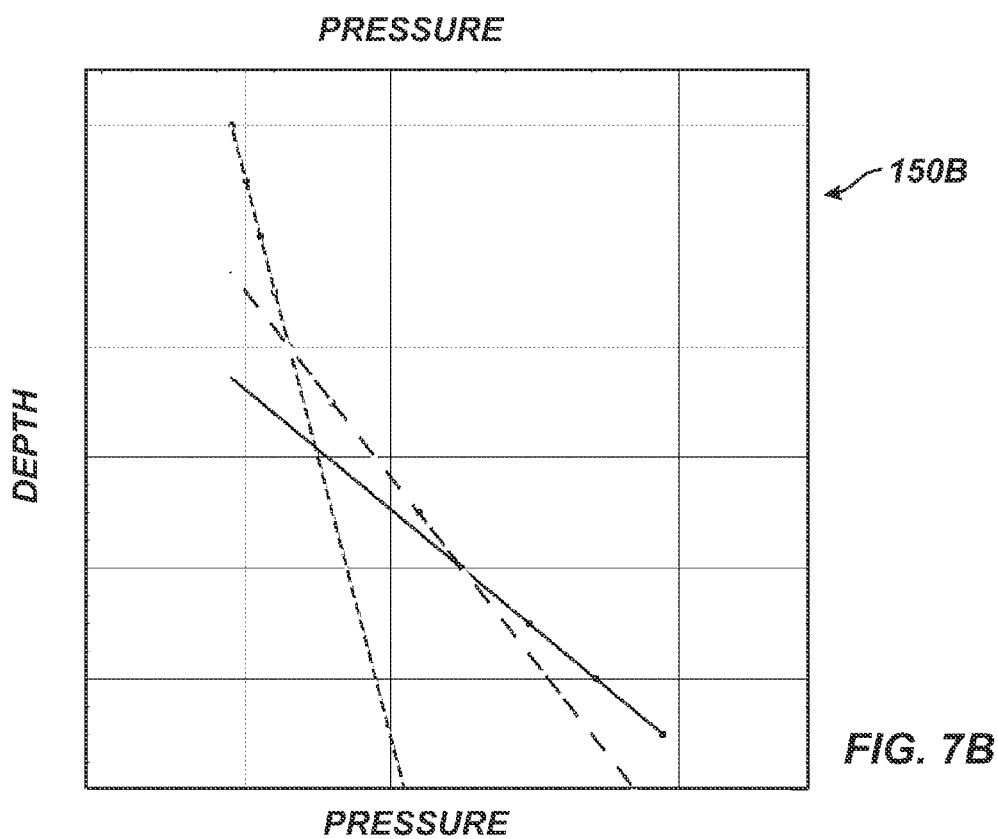
FIG. 7B shows the ideal solution to the synthetic example of FIG. 7A.

To further illustrate the cluster process 120, FIGS. 7A and 7B give respectively example data points and resultant clusters produced by the disclosed process 120 when applied to the two-dimensional data with linear prototypes. Graph 150A in FIG. 7A shows a synthetic pressure depth profile. The example is simplistic and corresponds to an ideal clustering situation where gas, oil, and water compartments are clearly defined without any data noise (the average error per point is zero). The optimal solution is picked up by the algorithm when run with three clusters as shown in graph 150B in FIG. 7B. Though the example might be trivial to a human analyst, the idea is to show that the algorithm is able to capture such a solution just as well as a human analyst. More complicated datasets are considered as can be seen in FIGS. 8.1 through 8.4 that follow.

For example, FIG. 8.1A shows a more complicated (real-life) data set 155A that may be obtained from downhole analysis. Using the disclosed clustering analysis 100 for this dataset in FIG. 8.1A, a number of pressure gradient solutions can be produced as shown in FIGS. 8.1B through 8.1J. The average error per data point with respect to their prototypes is shown atop every graph 155B-J. The average error in each of these various graphs 155B-J gives an indication of how off the measurements are from the expected data model. This average error can be compared to an error baseline—i.e., the expected measurement errors quantified based on the specifics of the tool used to make the measurements. Hence, the tool's specifications may be used to define an acceptable maximum error threshold. Evidently, the average error depends on the offset type used. Therefore, depending on which offset type is used, the threshold must be defined accordingly. Such error threshold is exploited in the second embodiment (error-constrained prototype-driven) cluster process to avoid having to explicitly prefix the number of clusters.

The solution of graph 155B in FIG. 8.1B represents a best "answer" to the given data set in FIG. 8.1A. In the solution of FIG. 8.1B, the key lines to focus on are lines 156a and 156b. Looking at the data clusters, there is a valid physical interpretation of the results. The clustered data associated with line 157 appears to represent a lower section with differing formation pressure from the remainder of the reservoir. The clustered data associated with line 156a appears to be a water leg in the reservoir (0.5 psi/ft). What is key here is the fact that this line 156a for the water leg appears to be communicating into two different reservoirs. It is physically impossible to have a fluid column with a different fluid density in the middle. This solution presents the analyst with a need to investigate whether a shale or other low permeability streak exists and is compartmentalizing the reservoir under analysis.

The clustered points associated with line 156b appears to represent a potential hydrocarbon leg (medium density oil 0.3 psi/ft). The clustered points associated with lines 158a-b are most likely supercharged points, which are not representative of formation pressure. The clustered points associated with lines 159a-c were most likely affected by low formation permeability when obtained and were not allowed to stabilize to formation pressure within the time allowed during testing.

As can be seen, the graph 155B in FIG. 8.1B represents one solution set with a number of lines 156-159 that offer a valid physical interpretation. Variations of other possible solutions to the same initial dataset are shown in FIGS. 8.1C through 8.1J.

Another pressure profile is shown in graph 160A of FIG. 8.2A. At first, this dataset exhibits no linear trend at all. However, applying the clustering techniques disclosed herein helps identify regions of similarity (linearity). In this example, the clustering has been run with varying number of clusters. The results of the clustering are shown in graphs 160B-D of FIGS. 8.2B through 8.2D.

A review of the results in FIGS. 8.2B-D indicates that while the total error is dropping with the increase in the number of clusters, there is a point where an optimum and physically possible solution is reached. This example forces the user to correlate the resultant clusters to some other petrophysical measurement to validate or reject the results. In this current example, six clusters as presented in graph 160D of FIG. 8.2D appears to present the best solution.

In FIG. 8.3A, the graph 165A shows a third real-life pressure profile. As one solution, graph 165B in FIG. 8.3B shows the dataset solved with three clusters. The line 166 is a gradient that may be clearly identified and confirmed by the user. The clustered points associated with line 167 correspond to points that are either outliers or unstabilized pressure points. The clustered points associated with line 168 may be low permeability supercharged points.

Graph 165C in FIG. 8.3C shows a variant solution to the initial dataset in FIG. 8.3A. In this example, one more cluster group or requirement has been added so that data points are associated with an additional line 169. However, addition of this cluster in the analysis has not substantially changed the answer from what was already derived in FIG. 8.3B. What this example shows is that in some cases there is limited value in increasing the complexity of the solution. In this way, the clustering algorithm can provide a "check" for the human analyst so the analyst can avoid interpretation bias and can avoid creating an overly complex solution.

Graph 170A in FIG. 8.4A shows an additional real-life dataset, and graphs 170B-H in FIGS. 8.4B through 8.4H show possible clustering solutions to the pressure profile in FIG. 8.4A. This is an example where the clustering algorithm "breaks down". There is a relatively large special difference between the points that may cause any automatic method to break down. This example also presents the problem as it exists to any analyst looking at this type of data. Clusters or groupings may appear to be obvious, but further investigation yields that the simple answer is not necessarily the correct one. The relatively low error of all the solutions represents a situation where data was not gathered with sufficient oversight and real time optimization. Had the user implemented this clustering algorithm as a real time control as the data is obtained, the potential hydrocarbon zone could have been better defined through either 1) gathering more data points in the zone of interest, or 2)

changing the acquisition plan to confirm or deny any potential sources of confusion. As this dataset exists presently, the data is inconclusive even using advanced graphical analysis methods that currently exist.

3. Refining Clustering Process Using Knowledge of the Particular Application

To achieve greater autonomy, knowledge related to the particular application of interest can be incorporated into the disclosed analysis 100 and process 120. For example, the analysis 100 and process 120 can use application-specific constraints related to reservoir pressure gradients described herein to refine the process. This additional information can be incorporated without changing the algorithm framework.

a. Characteristics of Gradient Data

As one example, knowledge of the various characteristics of the prototype for the gradient data of interest can provide additional information that may be exploited by the analysis 100 and cluster process 120. As discussed herein, the pressure gradients prototypes of fluids in a formation may be linear. These pressure gradients for formation fluids have characteristics that govern them, which may be computationally taken into consideration.

As mentioned earlier, it is expected that the slopes of the linear pressure gradients prototypes satisfy certain physical constraints. Precisely, these slopes should be within well-defined ranges representing all the naturally occurring fluid properties. As indicated previously, such information may be utilized in computing the data model (prototype). The linear constraints just mentioned allow the data model to be computed as a solution of a well-defined Quadratic Programming (QP) problem (i.e., quadratic objective function with linear constraints). This assures that only clustering solutions with plausible gradients are calculated without the need to have the user manually exclude such solutions from the solution set.

Figure 9:
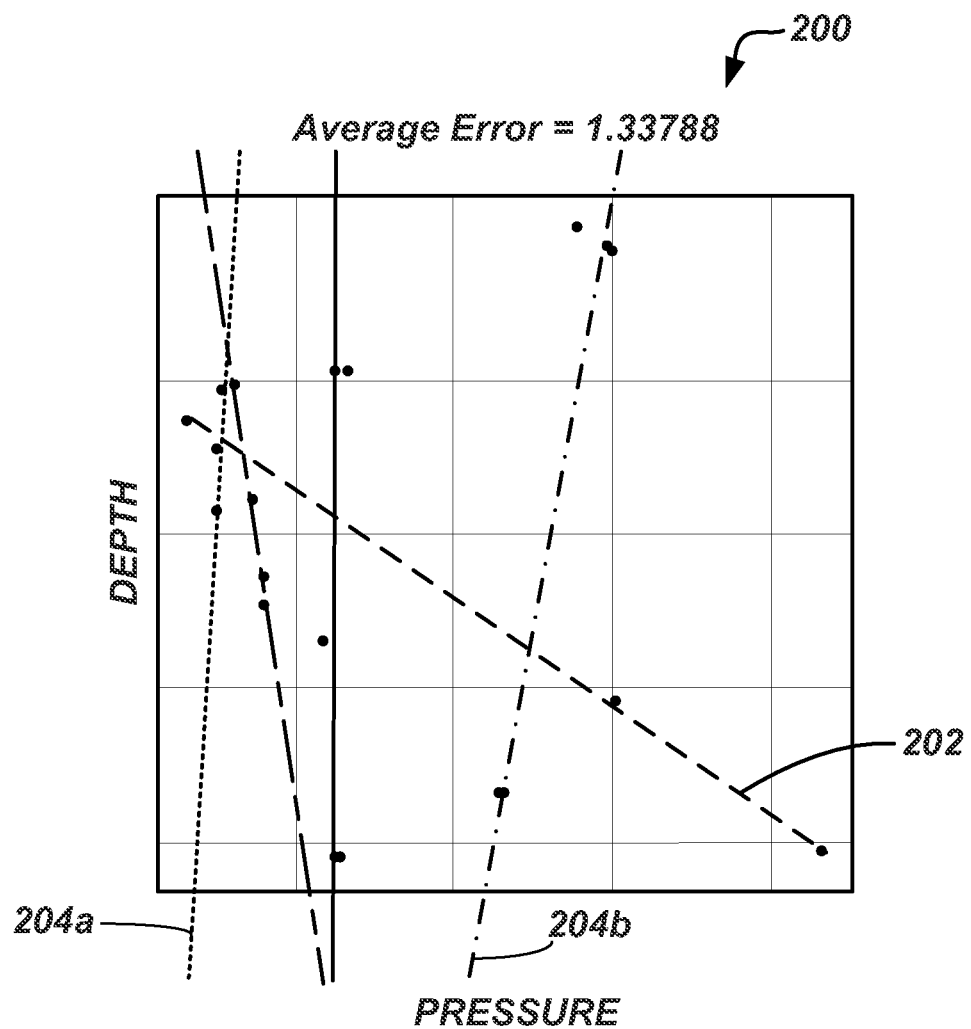
FIG. 9 shows a graph with an example solution having intersecting prototypes for a collection of data points.

As an example, two prototypes 204*a-b* in graph 200 of FIG. 9 have positive slopes in which pressure decreases with depth. Such an arrangement of pressure gradients represented by these prototypes 204*a-b* in this solution may be impractical and not physically feasible for a given application. Therefore, such a solution may be avoided autonomously according to the techniques disclosed herein.

Another instance where domain knowledge may be used is evident from the previous discussion of the error-constrained form of the cluster process 120-2 (FIG. 4). In particular, the error-constrained prototype-driven cluster process 120-2 can incorporate the anticipated error in the measurements into the computation of the clusters. The predetermined error threshold (specific to the application at hand) is thus used to directly constrain the solution set.

In another situation pertaining to the particular pressure gradient application every gradient prototype on its own is only required to be linear with negative slope in a certain range, but additional constraints exist that govern which set of prototypes may be collectively plausible. Particularly, pressure gradients are not allowed to extrapolate into one another. In other words, it is not practical to have solutions where two prototypes intersect while having data points on each of the four segments defined by their intersection point. This type of constraint is referred to as an inter-prototype constraint. (For a more general application other than the two-dimensional pressure gradient application, two prototypes may intersect one another at an intersection, which may not be a point depending on the problem dimension. In this instance, it may not be practical to have solutions where each of the prototypes has measurements associated therewith that are present in each portion of the intersecting prototypes around the intersection area.)

As one example, the gradient prototype 202 in graph 200 in FIG. 9 intersects (extrapolates through) all of the other determined prototypes. For formation fluid pressure gradients, such an arrangement represented by these prototypes in this solution is impractical (not physically feasible) as it violates the particular inter-prototype constraint just described. Therefore, such a solution could be excluded or reprocessed according to the technique that follows.

The particular characteristics of the prototypes and the governing parameters depend on the particular implementation, what properties are measured, the prototype (data model) definition, etc. As previously stated, present examples deal with pressure gradient data in a borehole. These tend to have linear prototypes and other characteristics as mentioned. With the benefit of the present disclosure, the teachings disclosed herein can be applied to other measured properties, clustering of data points, data models (prototypes), etc.

b. Inter-Prototype Constraints

As noted previously, knowledge of domain-specific constraints between prototypes (inter-prototype constraints) can provide means by which more autonomy is achieved by the disclosed analysis 100 and process 120. For example, inter-prototype constraints may constrain how prototypes intersect with one another, how far apart they must be, whether they can be parallel to one another, and the like.

As discussed herein, pressure gradients are indicative of the type of fluid in a formation. Because formation fluids act as barriers to one another in a downhole environment, their gradients do not extrapolate into each other's cluster. More precisely, it is not physically possible to have the gradients of two fluids intersect such that data points are present in all four quadrants around the contact (intersection) point of their gradients (prototypes). Therefore, knowledge of how the prototypes for the gradient data of interest can intersect one another can be used to further guide the disclosed analysis 100 and process 120.

Again, FIG. 9 shows intersecting prototypes (graph 200). Up to this point, the disclosed process 120 may produce intersecting clustering solutions as the one in FIG. 9. When this is not a physical possibility for the given application, the process 120 preferably seeks to remove such intersections.

To satisfy the non-intersecting prototype property, the process 120 can take a cluster solution that contains intersecting prototypes as in FIG. 9 and can transform it into one or more solutions that have no intersecting prototypes. Any transformed solution will still be a local optimum for the objective function $F_c$ (i.e., clustering criterion). This scheme allows the inter-prototype constraints to be incorporated without backtracking to modify the original process (i.e., by applying a process extension (add-on)).

Figure 10:
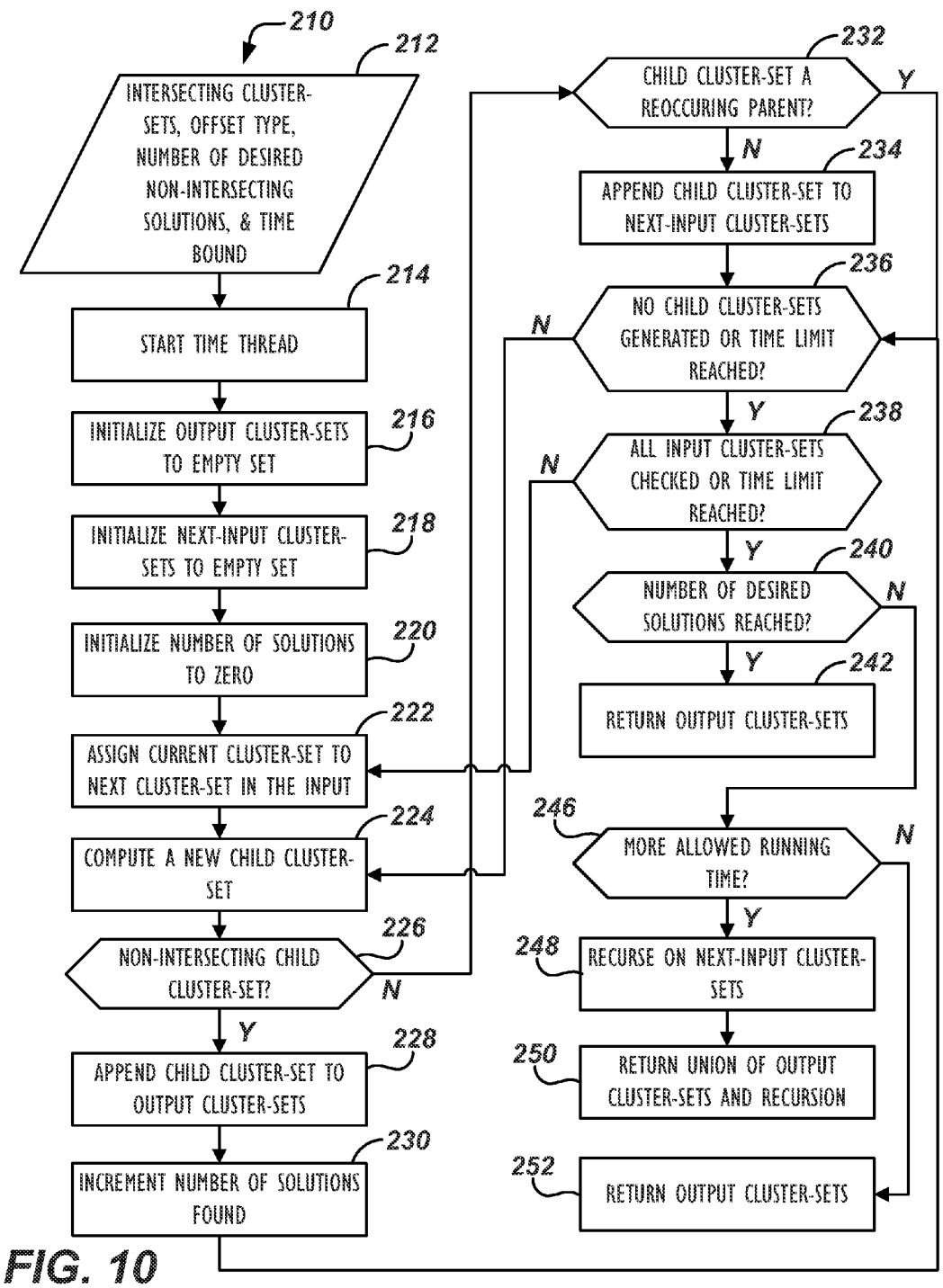
FIG. 10 shows an intersection removal process for removing intersecting prototypes so that data points from two clusters in a solution are not present in all four segments around the intersection (contact) point.

Referring to FIG. 10, an intersection removal process 210 resolves all prototype intersections so data points from any two clusters of intersecting prototypes in the solution will not be present in all four segments around the contact point of the two prototypes. Following the intersection resolution, the output cluster set will still be a local optimizer for $F_c$.

Figure 11A:
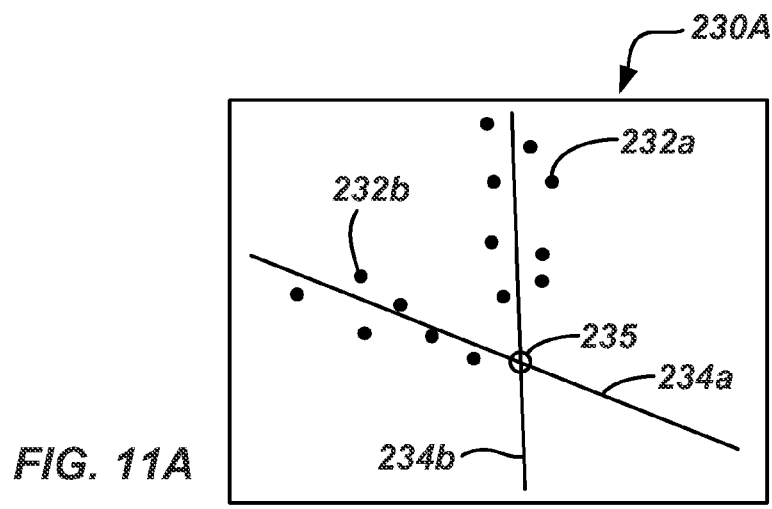
FIGS. 11A-11C show illustrative graphs related to the intersection removal process of FIG. 10.

First turning to an illustration, FIG. 11A shows a graph 230A having data points 232*a-b* and two prototypes 234*a-b* that intersect at an intersection 235. As shown, the data points 232*a-b* from the two clusters do not lie in all four segments around the intersection 235 of the prototypes 234*a-b*. This is consistent with the characteristics of pressure gradients for fluid in a formation.

Figure 11B:
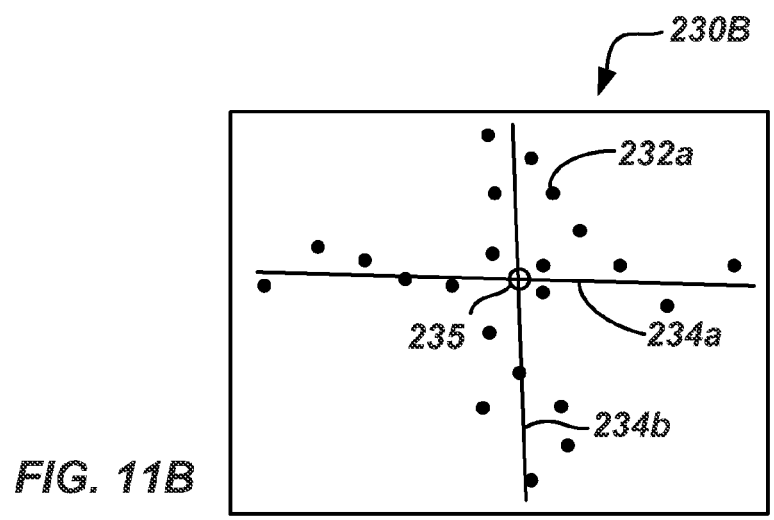

By contrast, FIG. 11B shows a graph 230B having data points 232a-b and two prototypes 234a-b that intersect at intersection 235. Here, the data points 232a-b are present on all four sides of the intersection 235 of the prototypes 234a-b (i.e., for each of the two clusters, points are present on both sides of the prototype around the intersection point 235). For pressure gradients representing fluid properties and represented by linear prototypes, having such an arrangement of the data points 232a-b may not be possible. Therefore, these intersecting prototypes 234a-b and corresponding data points 232a-b need more processing to develop a domain-proof solution for the pressure gradient application.

To resolve intersections, the intersection removal process 210 of FIG. 10 follows a breadth-first search to generate a tree structure in which each node is a child cluster-set. (As is known, a breadth-first search generates all immediate child nodes and follows with the generation of the child nodes at the next level and so on.) The tree's root node is the original problematic intersecting parent cluster-set that is subject to the resolution.

The process 210 recursively performs tree generation using breadth-first search. As the tree is being generated, every child node (cluster-set) is checked to determine if it is intersecting or non-intersecting. All non-intersecting child nodes are kept in output cluster-sets before finally being output when either (1) a time bound is reached, (2) enough non-intersecting solutions have been found, or (3) exploration of the tree structure has been completed (i.e., all terminal nodes (non-intersecting) have been generated).

As used here, a child cluster-set is obtained by applying a transformation to its parent cluster-set. A transformation of any parent cluster-set is an attempt to resolve a given intersection in the parent (input) cluster-set. While every child cluster-set is a locally optimal clustering solution, it is not necessarily non-intersecting. Thus, the tree-based exploration is in fact a trial-and-error approach to resolve all intersections.

The idea behind the intersecting cluster-set transformation is to choose one fixed intersection and one fixed segment, then disperse the points that are the closest to that segment onto other clusters. This is then followed by the optimization step of either of the two embodiments disclosed herein. To do this, the removal process 210 chooses one intersection in the input cluster-set and a prototype segment for the chosen intersection and disperses the data points associated with (closest to) the chosen segment into other clusters. Every child cluster is checked for whether it is non-intersecting or not. If not, then the non-intersecting child cluster-set is added to the current output cluster-sets. If intersecting, then an intersecting child cluster-set is added to the next-input cluster-sets to be recursed on if it is a non-reoccurring parent cluster-set.

Figure 11C:
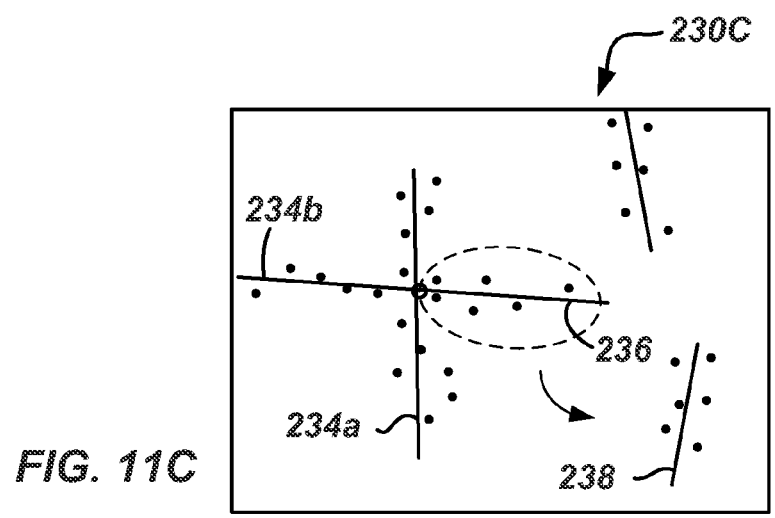

As shown in FIG. 11C, for example, a prototype segment 236 from a couple of intersecting prototypes 234a-b is chosen. The data points 232b associated with this segment 236 are then assigned to (dispersed into) the clusters of the closest prototypes (excluding the one being resolved) and optimization is carried out thereafter based on one of the two clustering embodiments discussed in this disclosure.

The breadth-first tree generation exhaustively applies all possible transformations to any given node by varying the choices of the intersection point and segment. Again, every terminal node in the tree should be a non-intersecting cluster-set.

As opposed to the trial-and-error approach discussed above, intersections to be resolved can be chosen based on a fixed heuristic, and segments whose data is to be dispersed can also be chosen deterministically each time to resolve a given intersection. Such a deterministic approach, however, may fail if cycling occurs (regeneration of an input cluster). For this reason, a brute force (trial-and-error) approach is used (via tree exploration) to resolve a given intersecting clustering.

Turning now to further details, the intersection removal process 210 of FIG. 10 uses the input intersecting cluster sets, offset type, number of desired non-intersecting solutions, and the time bound as input (Block 212). Initially, only one intersecting cluster set is input, but multiple ones will be input as more processing (recursion) is performed.

The removal process 210 starts a time thread to control processing time (allow forceful process termination) (Block 214) and performs a number of initializations to set up processing. In particular, the process 210 initializes the output cluster-sets to the empty set (Block 216), initializes the next-input cluster-sets to the empty set (Block 218), and initializes the number of solutions found to zero (Block 220).

At this point, the removal process 210 starts repetitive processing (Blocks 222 to 238) until all input cluster-sets have been checked or a specific limit has been reached. In this repetitive processing, the process 210 first assigns the current cluster-set to the next cluster-set in the input of intersecting cluster-sets (Block 222). Taking this next cluster-set, the process 210 computes a new child cluster-set of the current cluster-set (Block 224). As discussed herein, a child is obtained by dispersing the set points from one particular intersection segment to another cluster and optimizing the resulting clustering rearrangement.

If the above computed child cluster-set is a non-intersecting cluster (Yes at Decision 226), then the process 210 appends this non-intersecting child cluster-set to the output cluster-sets (Block 228) and increments the number of solutions found accordingly (Block 230). Otherwise (No at Decision 226), the process 210 continues analysis of this intersecting child cluster-set.

In this instance, the process 210 determines if this intersecting child cluster-set is a reoccurring parent cluster-set (Decision 232). If not, then the process 210 appends this child cluster-set to the next-input cluster-sets (Block 234).

Overall, the process 210 continues computing new child cluster sets, determining if they are non-intersecting or non-reoccurring parent nodes, and appending them to the output cluster-sets or next-input cluster sets (Blocks 224 to 234) until no child cluster-sets can be generated, the time bound is reached, or the number of desired solutions found have been reached (tree exploration is complete/terminated, Decision 236). The process iterates through blocks 222-236 for all input cluster-sets and terminates when Decision 238 is affirmative i.e., all input cluster-sets have been analyzed, the time bound is reached, or the number of desired solutions found has been reached.

At the end of this, the process 210 finally checks if the number of desired solutions found has been reached (Decision 240). If so, then the process 210 returns the output cluster-sets as the resulting solutions of the intersection removal (Block 242). Otherwise, if the number of solutions has not been reached, then the process 210 continues if there is more allowed running time left (Decision 246) and if not it returns the output cluster-sets as the resulting solutions of the intersection removal even though the process 210 was unable to find enough solutions (Block 252).

Should time be left (Yes at Decision 246), the process 210 recurses on the next-input cluster-sets (within the remaining time bound) (Block 248) and returns the union of the output cluster-sets and the output from above recursion as the resulting solutions of the intersection removal (Block 250).

Once more, the removal process 210 continues until either (1) enough solutions (terminal nodes) that satisfy this particular inter-prototype constraint are found, (2) tree generation is complete, or (3) the process times out.

Note that in the case of the second embodiment in which error constraints are used, if dispersing data points as in Block 224 yields clusters that do not satisfy the error threshold, the divisive steps of the error-constrained prototype-driven clustering process 120-2 (FIG. 4) are applied to any invalid cluster until convergence is achieved (possibly with a relaxed threshold). This approach, however, does not prevent infinite cycling between the intersection resolution and error maintenance. In other words, as the data points from one intersection segment are dispersed, error maintenance may yield back the same intersecting clustering configuration. Cycling is identified when a child node happens to be a previous parent node, and hence further recursion may not be applied to such a node.

Pseudo-code for a processor to implement the intersection removal process 210 can be represented as follows:

---

INTERSECTION REMOVAL ALGORITHM PSEUDO-CODE

---

```
Given intersecting cluster-sets, the offset type, number of desired
    solutions, and running time bound
Begin
    Start time thread
    Initialize output cluster-sets to the empty set
    Initialize next-input cluster-sets to the empty set
    Initialize number of solutions to zero
    Repeat
        Assign current cluster-set to the next cluster-set in the input
            (intersecting cluster-sets)
        Repeat
            Compute a new child cluster-set of the current cluster-set (a
                child is obtained by dispersing the set points from one
                particular intersection segment and optimizing);
            If above child cluster-set is non-intersecting then
                Append it to the output cluster-sets
                Increment the number of solutions found
            Else
                If child cluster-set is not a reoccurring parent cluster-set
                then
                    Append child cluster-set to the next-input cluster-sets
                End if
            End if
        Until no child cluster-sets can be generated, time bound is
            reached, or number of desired solutions is reached
    Until all input cluster-sets have been checked, time bound is reached,
        or number of desired solutions is reached
    If number of desired solutions is reached then
        Return output cluster-sets
    Else if there is more allowed running time left
        Recurse on next-input cluster-sets (with the remaining time
            bound)
        Return the union of output cluster-sets and the output from
            above recursion
    Else
        Return output cluster-sets (unable to find enough solution)
    End if
End
```

Should non-intersecting solutions be imposed, the cluster process 120 can obtain multiple solutions by repeatedly applying the process steps and outputting only the non-intersecting solutions while storing the intersecting ones in the background until termination. If not enough non-intersecting solutions can be found in the allocated time, the intersection removal process 210 of FIG. 9 can transform the intersection solutions in the remaining allowed time bound (i.e., searching the tree until enough terminal nodes are found) to possibly generate the remaining required number of solutions.

G. Additional Applications for the Disclosed Analysis

Many applications can benefit from the disclosed analysis 100 (and processes 120-1, 120-2, and 210) disclosed herein. In addition to pressure gradients, other types of petrophysical properties relating two or more measurable variables can benefit from the disclosed analysis 100; for instance, fluid density, fluid viscosity, temperature, flow rate, concentration, or other measurable variable. In a different example, the analysis 100 can be used to cluster acoustic waveform logging data to infer geological information. These and other applications may benefit from the disclosed analysis 100. Below, we describe few additional applications of the analysis 100.

A straightforward application is the detection of linear slopes of multiple pressure flow regimes plotted on a log-log scale using a commonly practiced analysis methodology. On the appropriate scale, the slope of a linear flow is an indicative of the type of regime present (e.g. radial flow, volumetric behavior, linear flow, the bilinear flow, the spherical flow). Knowing that potentially any combination of regimes might be simultaneously present, the cluster process 120 can recognize any of the regimes that occur in a given reservoir.

Classifying lithofacies of hydrocarbon reservoirs based on several well logs (e.g., density, seismic, etc.) allows the modeling of and the determination of many reservoir characteristics (e.g., permeability, porosity, reservoir flow units, etc.). Many classifiers (e.g., support vector machines, neural networks, etc.) have been developed to achieve this purpose wherein training data is used to construct lithofacies classifiers. The disclosed analysis 100 can be exploited for the same purpose since the clustering approach uses class prototypes that can have any mathematical form.

In this way, even in the absence of a priori mathematical equations formalizing class prototypes, training data can be used to learn about lithofacies class structures. In this supervised mode, learning methods can construct a distinct model prototype for each lithofacy class (mixed-type class prototypes) or a same model prototype with different parameter ranges for each class (constrained prototypes). Once this offline stage is performed, the disclosed cluster analysis 100 can be carried out in real-time based on the learned prototypes.

In some additional examples, the clustering process can be applied to other applications in which the environment has measurable variables, such as a batch pharmaceutical reaction, an industrial blending application, a pharmaceutical blending application, a food processing application, etc. Detailed descriptions of the cluster analysis applied to these applications are not provided herein because the analysis discussed above with respect to pressure gradient data provides a clear explanation of the procedures required for cluster analysis, which can be equally applied to these and other applications of interest.

Figure 12:
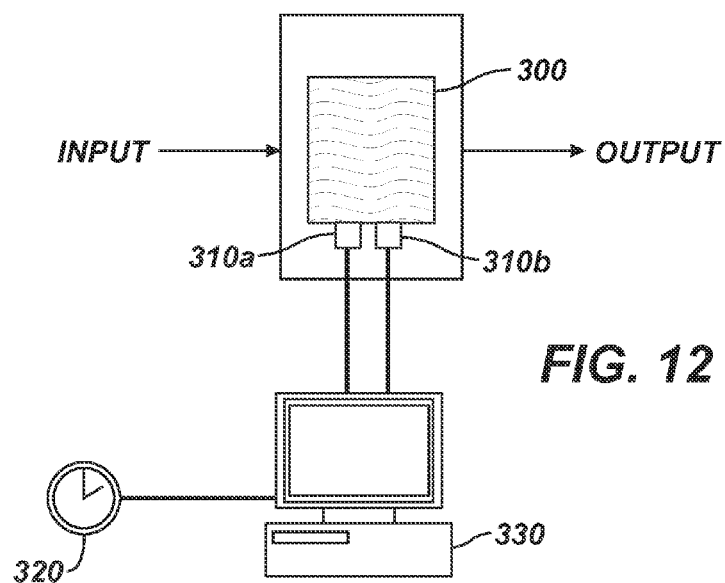
FIG. 12 diagrams a process of another application to which the disclosed clustering analysis can be applied.

Briefly, however, the applications as shown in FIG. 12 can have a process 300 having certain inputs and outputs. One or more sensors 310*a-b* can monitor the process 300 and measure desirable variables, such as pressure, temperature, reaction products, density, viscosity, etc. Additionally, a timer 320 may obtain time values as an additional variable of the process 300. A processing device 330, such as a computer or the like, obtains measurements from the one or more sensors 310*a-b* and/or the timer 320 and analyzes the measurements using the clustering analyses disclosed herein.

For example, the process 300 may be a batch pharmaceutical reaction, and the clustering process can be applied to time versus chemical concentration data for the reaction to determine a physical property of the reaction. The process 300 may be an industrial blending application in which multiple constituents are combined. In this case, the clustering process can be applied to time versus density measurements to determine a physical property of the blending.

In other examples, the process 300 may be a pharmaceutical blending application, and the clustering process can analyze time versus fluorescence output to determine a physical property of the blending. Finally, the process 300 may be a food processing application, and the clustering process can analyze time versus a degrees brix (° Bx) measurement of the process 300 to determine a property of the food produce produced. These and other processes can benefit from the disclosed clustering techniques.

As will be appreciated, teachings of the present disclosure can be implemented in digital electronic circuitry, computer hardware, computer firmware, computer software, or any combination thereof. Teachings of the present disclosure can be implemented in a computer program product tangibly embodied in a machine-readable storage device for execution by a programmable processor so that the programmable processor executing program instructions can perform functions of the present disclosure. The teachings of the present disclosure can be implemented advantageously in one or more computer programs that are executable on a programmable system including at least one programmable processor coupled to receive data and instructions from, and to transmit data and instructions to, a data storage system, at least one input device, and at least one output device. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The foregoing description of preferred and other embodiments is not intended to limit or restrict the scope or applicability of the inventive concepts conceived of by the Applicants. It will be appreciated with the benefit of the present disclosure that features described above in accordance with any embodiment of aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A measurement clustering method, comprising:
    obtaining measurements of a downhole environment, each measurement being multi-dimensional and consisting of a plurality of variables in the downhole environment;
    obtaining prototypes defining expected relationships between the variables for predicting one or more physical properties of the downhole environment;
    determining errors of the measurements relative to the prototypes;
    assigning each of the measurements to one of the prototypes for which the determined error is least;
    fitting each of the prototypes to its cluster of assigned measurements; and
    predicting the one or more physical properties of the downhole environment based on the characteristics of the cluster-fitted prototypes relating the variables in the downhole environment,
    wherein determining the errors comprises determining that at least one of the clusters of the measurements violates an error constraint with respect to its original prototype and reassigning the measurements of the at least one cluster to newly initiated prototypes.

2. The method of claim 1, further comprising repeating the acts of determining, assigning, and fitting until convergence.

3. The method of claim 1, wherein the prototypes each define a pressure gradient relating a formation pressure as one of the variables to a formation depth as another of the variables.

4. The method of claim 3, wherein the prototypes each define a linear function in one variable relating the formation pressure to the formation depth and being indicative of a type of fluid in the formation.

5. The method of claim 1, wherein the variables include pressure, depth, density, viscosity, temperature, flow rate, concentration, time, fluorescence output, degrees brix (° Bx) measurement, a measurable property, or a measurable state.

6. The method of claim 1, wherein obtaining the measurements comprises accessing the measurements from storage or making the measurements with a downhole measurement device.

7. The method of claim 1, wherein obtaining the prototypes comprises initially obtaining a predetermined number of random prototypes.

8. The method of claim 1, wherein assigning the measurements to the prototypes comprises initially assigning all of the measurements as a single cluster to a single prototype.

9. The method of claim 1, further comprising recursively repeating the acts of determining and reassigning.

10. The method of claim 9, wherein reassigning the measurements of the at least one cluster to the newly initiated prototypes comprises adaptively partitioning the at least one cluster, and any successive child clusters of the measurements partitioned therefrom during the recursion, into two child clusters.

11. The method of claim 2, wherein the error constraint comprises a maximum expected measurement error of a downhole measurement device measuring at least one of the variables in the downhole environment, an error statistic of the assigned measurements, or a maximum error variance of the assigned measurements.

12. The method of claim 1, wherein reassigning the measurements of the at least one cluster to the newly initiated prototypes comprises:
    initiating two of the newly initiated prototypes to replace the original prototype to which the measurements are assigned; and
    assigning each of the measurements of the at least one cluster to one of the two newly initiated prototypes for which a least error exists.

13. The method of claim 12, wherein assigning each of the measurements of the at least one cluster to the one of the two newly initiated prototypes further comprises:
    identifying a reoccurring cluster; and
    resolving the reoccurring cluster by reapplying the steps of initiating two of the newly initiated prototypes and assigning each of the measurements; or accepting the reoccurring cluster even if it violates the error constraint by limiting the number of reapplications of the steps to resolve the reoccurring cluster.

14. The method of claim 12, wherein assigning each of the measurements of the at least one cluster to the one of the two newly initiated prototypes for which the least error exists comprises:
   determining a distance of a given one of the assigned measurements to each of the two newly initiated prototypes; and
   assigning the given one of the measurements to the one newly initiated prototype having a least distance than the other newly initiated prototype.

15. The method of claim 14, wherein the distance is measured by a perpendicular offset or a vertical offset between the given measurement and the newly initiated prototype.

16. The method of claim 1, wherein fitting each of the prototypes to its assigned measurements comprises performing a best fit of each of the prototypes to its assigned measurements.

17. The method of claim 1, wherein predicting the one or more physical properties of the downhole environment based on the characteristics of the cluster-fitted prototypes relating the variables in the downhole environment comprises determining whether any of the cluster-fitted prototypes violate a constraint.

18. The method of claim 17, wherein the constraint governs how two or more of the cluster-fitted prototypes intersect with one another, and wherein the method further comprises removing any intersection by reanalyzing the cluster-fitted prototypes violating the constraint.

19. The method of claim 1, further comprising producing multiple solutions each having the one or more physical properties of the downhole environment by performing the measurement clustering method multiple times on the same measurements obtained of the downhole environment.

20. The method of claim 19, further comprising determining a quality of the fitted prototypes to the measurement clusters based on the multiple solutions.

21. The method of claim 19, further comprising assessing the multiple solutions based on error valuations between them.

22. The method of claim 19, further comprising determining a level of ambiguity in the multiple solutions and providing guidance for further measurement acquisition.

23. The method of claim 1, wherein obtaining the prototypes comprises restricting the obtained prototypes to the prototypes that meet at least one mathematical constraint dictated by physics of the downhole environment, whereby the acts of determining, assigning, and fitting are based on the restricted prototypes.

24. The method of claim 23, wherein determining the errors and assigning each of the measurements to the one restricted prototype comprises:
   assigning the measurements as clusters to the restricted prototypes;
   determining that at least one of the clusters violates an error constraint with respect to its original restricted prototype and reassigning the measurements of the at least one cluster to newly initiated restricted prototypes; and
   recursively repeating the acts of determining and reassigning based on the error constraint determination.

25. The method of claim 23, wherein fitting each of the restricted prototypes to the measurements assigned thereto comprises performing a constrained best fit.

26. The method of claim 1, wherein fitting each of the prototypes to the cluster of its assigned measurements comprises:
   determining that at least two of the prototypes intersect one another at an intersection and that each have the assigned measurements present in each portion of the intersecting prototype around the intersection; and
   reassigning the one or more measurements assigned to one of the portions of one of the intersecting prototypes to one of the other prototypes for which a least error exists.

27. The method of claim 26, further comprising repeating the acts of fitting, determining, and reassigning.

28. The method of claim 26, wherein reassigning the one or more measurements comprises choosing a set of the one or more measurements to be reassigned by performing a breadth-first search (BFS) approach.

29. The method of claim 28, wherein performing the BFS approach comprises computing multiple clustering solutions without intersecting prototypes.

30. The method of claim 28, further comprising avoiding cycling by identifying reoccurring clusters when the BFS approach yields back a previous clustering solution.

31. The method of claim 1, wherein obtaining the measurements comprises obtaining the measurements in real-time with a downhole measurement device;
   whereby the acts of determining, assigning, and fitting are performed incrementally as each of the measurements is obtained in real-time.

32. The method of claim 31, further comprising repeating the acts of determining, assigning, and fitting until convergence.

33. The method of claim 32, wherein after the convergence and before predicting, the method further comprises incrementally as each of the measurements is obtained in real-time:
   determining if at least one of the clusters of the measurements violates an error constraint with respect to its original prototype and reassigning the measurements of the at least one cluster to newly initiated prototypes;
   recursively repeating the acts of determining and reassigning based on the error constraint determination;
   assigning each of the measurements to one of the prototypes for which the least error is determined;
   fitting each of the prototypes to its cluster of assigned measurements; and
   repeating the acts of determining, recursing, assigning, and fitting until convergence.

34. The method of claim 31, wherein after the convergence and before predicting, the method further comprises incrementally as each of the measurements is obtained in real-time:
   restricting the prototypes to those prototypes that meet at least one mathematical constraint dictated by physics of the downhole environment;
   determining errors of the measurements relative to the restricted prototypes;
   assigning each of the measurements to the one restricted prototype for which the determined error is least; and
   fitting each of the restricted prototypes to the measurements assigned thereto.

35. A programmable storage device having program instructions stored thereon for causing a programmable control device to perform a measurement clustering method according to claim 1.

36. A measurement clustering system, comprising:
a memory for storing measurements of a downhole environment, each measurement being multi-dimensional consisting of a plurality of variables in the environment; and
a processor operatively coupled to the memory and configured to perform a measurement clustering method according to claim 1.

* * * * *